US010354408B2

United States Patent
Hufnagel et al.

(10) Patent No.: US 10,354,408 B2
(45) Date of Patent: Jul. 16, 2019

(54) VEHICLE CAMERA IMAGE PROCESSING

(71) Applicant: Harman International Industries, Inc., Stamford, CT (US)

(72) Inventors: Brian Hufnagel, Brighton, MI (US); Damian Eppel, Lodz (PL); Przemyslaw Szewczyk, Lodz (PL)

(73) Assignee: Harman International Industries, Incorporated, Stamford, CT (US)

(*) Notice: Subject to any disclaimer, the term of this patent is extended or adjusted under 35 U.S.C. 154(b) by 22 days.

(21) Appl. No.: 15/655,345

(22) Filed: Jul. 20, 2017

(65) Prior Publication Data

US 2018/0025507 A1  Jan. 25, 2018

Related U.S. Application Data

(60) Provisional application No. 62/364,630, filed on Jul. 20, 2016.

(51) Int. Cl.
| | |
|---|---|
| *G06K 9/36* | (2006.01) |
| *G06T 7/73* | (2017.01) |
| *G06K 9/00* | (2006.01) |
| *G06T 7/70* | (2017.01) |
| *G06T 3/00* | (2006.01) |
| *B66F 9/075* | (2006.01) |

(52) U.S. Cl.
CPC ............ *G06T 7/74* (2017.01); *G06K 9/00791* (2013.01); *G06T 3/0062* (2013.01); *G06T 7/70* (2017.01); *B60W 2420/42* (2013.01); *B66F 9/0755* (2013.01)

(58) Field of Classification Search
CPC .............. H04N 7/181; B60R 2300/207; B60R 2300/607; B60R 2300/303; B60R 2300/60; B60R 2300/602; B60R 2300/8093; G06T 2207/30252; G06T 5/006; G06K 9/00791; G06K 2009/2045; G06K 9/00798; G06K 9/00805; G05D 2201/0213

See application file for complete search history.

(56) References Cited

U.S. PATENT DOCUMENTS

| | | | |
|---|---|---|---|
| 6,734,896 B2 * | 5/2004 | Nobori ...................... B60R 1/00 | 348/148 |
| 9,201,421 B1 * | 12/2015 | Fairfield ............... B60W 40/04 | |

(Continued)

*Primary Examiner* — Bhavesh M Mehta
*Assistant Examiner* — Ian L Lemieux
(74) *Attorney, Agent, or Firm* — Brooks Kushman, P.C.

(57) ABSTRACT

Methods and systems for developing image processing in a vehicle are described. In an example, a system, a tool or method may be used to determine the effect of changing parameters for processing the image data from a vehicle camera without actually processing the image. The image may be processed after the parameters reach a threshold of minimum requirements. After the image is approved, the parameters may be stored and transmitted to a separate system to be integrated into head unit instructions of a vehicle or loaded into head unit memory in a vehicle. The vehicle may display a processed image in a vehicle display. Vehicle processing circuitry may develop image processing for a vehicle are described. In an example, the image processing that relates to preparing an image for display occurs in the head unit in the vehicle may be positioned away from the camera itself.

12 Claims, 19 Drawing Sheets

(56) References Cited

U.S. PATENT DOCUMENTS

| | | | |
|---|---|---|---|
| 2003/0137586 A1* | 7/2003 | Lewellen | H04N 7/181 |
| | | | 348/148 |
| 2005/0190262 A1* | 9/2005 | Hamdan | B60R 1/00 |
| | | | 348/148 |
| 2008/0231710 A1 | 9/2008 | Asari et al. | |
| 2010/0253540 A1* | 10/2010 | Seder | B60R 1/00 |
| | | | 340/905 |
| 2012/0002050 A1* | 1/2012 | Taniguchi | H04N 7/181 |
| | | | 348/148 |
| 2012/0320190 A1 | 12/2012 | Natroshvili et al. | |
| 2013/0073775 A1* | 3/2013 | Wade | G06F 13/4022 |
| | | | 710/316 |
| 2014/0028852 A1* | 1/2014 | Rathi | H04N 7/181 |
| | | | 348/159 |
| 2014/0152778 A1* | 6/2014 | Ihlenburg | G06T 15/205 |
| | | | 348/47 |
| 2014/0176350 A1* | 6/2014 | Niehsen | B62D 15/025 |
| | | | 340/988 |
| 2014/0347485 A1* | 11/2014 | Zhang | B60R 11/04 |
| | | | 348/148 |
| 2015/0156391 A1 | 6/2015 | Huang et al. | |
| 2015/0210274 A1* | 7/2015 | Clarke | B60W 30/00 |
| | | | 382/104 |
| 2016/0055629 A1 | 2/2016 | Jang et al. | |

* cited by examiner

VEHICLE CAMERA IMAGE PROCESSING

CROSS-REFERENCE TO RELATED APPLICATIONS

This application claims the benefit of U.S. provisional application Ser. No. 62/364,630 filed Jul. 20, 2016, the disclosure of which is hereby incorporated in its entirety by reference herein.

TECHNICAL FIELD

The present disclosure generally relates to image processing for vehicles and tools to develop image processing methods for motor vehicle applications.

BACKGROUND

Cameras are used in vehicles to provide views of the surrounding environment to a driver. The camera can take an image and process the image and send the processed image to a display in the vehicle cabin for display. Setting the image for display in the vehicle can be computing intensive and take a significant period of time.

SUMMARY

Methods and systems for developing image processing in a vehicle are described. In an example, a system, a tool or method may be used to determine the effect of changing parameters for processing the image data without actually processing the image. The image may be processed after the parameters reach a threshold of minimum requirements. After the image is approved, the parameters may be stored and transmitted to a separate system to be integrated into head unit instructions or loaded into head unit memory.

Methods and systems for displaying a processed image in a vehicle are described. Methods and systems for developing image processing in a vehicle are described. In an example, the image processing that relates to preparing an image for display occurs in the head unit in the vehicle away from the camera itself.

A vehicle image processing system is described. The vehicle image processing system may be part of a head unit for a vehicle, e.g., a passenger vehicle. The image processing system may include an image source to provide image data and an image processor to receive the image data and process the image data to output a display image according to processing parameters. The processing parameters may be generated by loading camera parameters, selection of output requirement parameters, selecting annotation settings, calculating a view of a raw image data, adjusting parameters, outputting adjusted view using adjusted parameters without recalculating the entire raw image, or combinations thereof. The processor may receive an indication that the image data passes image inspection. Thereafter, the image processor may set the processing parameters to output the display image for a specific vehicle to adjust for the camera type and operation and the output device in the vehicle. The system also includes a display to receive the display image and output the display image.

In an example, the image processor processes the image data by repeating the process tasks, if the display image does not pass an inspection. The image processor may adjust one or more parameters and then output an adjusted view using adjusted parameters without recalculating the entire raw image. When the image data passes image inspection, the image processor sets the processing parameters to output the display image for a specific vehicle to adjust for the camera and output device.

In an example, a head unit for a vehicle includes a memory to store the parameters for processing the image data when the processing passes inspection.

In an example, the image processor processes the image data with parameters set without graphically processing a new output image from the raw image file.

In an example, a global positioning system is used to determine a location of the vehicle and to set a location parameter based on the location of the vehicle. The image processor uses the location parameter to set processing to the raw image data or the previously processed image. The image processor can overlay the location parameters on the display data output at the vehicle display. The image processor can use the location data to change other processing parameters used to process the image.

In an example, the image source is wide angle camera with a field of view greater than 130° and up to about 200°. The processing parameters are set to correct for at least some of distortion of the image data resulting from a wide-angle camera.

In an example, the image processor is remote from the camera.

Methods for processing images in a vehicle mounted imager are described. The method includes loading processing parameters to process an image from a vehicle camera, receiving a raw image file that was produced by a vehicle camera, processing the raw image file using the processing parameters to output a first output image, displaying the first output image, changing at least one of the parameter of the processing parameters, and outputting a reprocessed output image based on changed parameters without graphically reprocessing the raw image file.

In an example, loading processing parameters includes loading a distortion strength parameter, a zoom level parameter, a vertical offset parameter, a horizontal offset parameter, and a tilt level parameter.

In an example, changing at least one of the parameter of the processing parameters results a near real-time change in outputting a reprocessed output image.

In an example, outputting a graphical user interface showing more than one of the processing parameters.

In an example, outputting the graphical user interface includes a single screen interface to change most of the processing parameters and then output a sample image.

In an example, outputting the graphical user interface includes outputting at least one of a perspective view 3D visualization diagram, overlay parameters, car parameters, and steering wheel angle parameter, and a combination thereof.

In an example, outputting the graphical user interface includes receiving position data from a navigational positioning system, integrating the position data with the graphical user interface, and displaying the graphical user interface with camera produced video and the positional data from the navigational positioning system.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
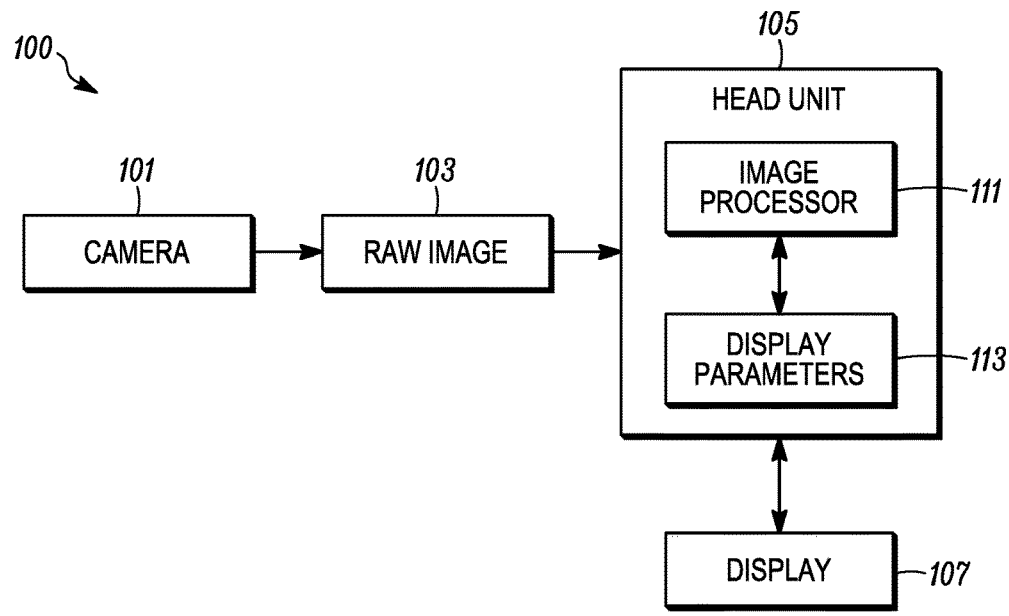
FIG. 1 illustrates a schematic view of a vehicle with an imaging system according to an embodiment of the present disclosure.

FIG. 1 is a schematic view of one example of a vehicle 100 with an imaging system 101. The vehicle 100 includes different systems that interact to provide motive forces and provide a suitable environment for the user and passengers. Vehicle 100 can include an engine, transmission, and wheels. The engine can be an internal combustion engine, a hybrid engine, or an electric motivator. Vehicle 100 can further include cabin controls that can be used by the user to control the experience in the cabin and operate the vehicle. One such system is an imaging system that can produce views of the outside environment around the vehicle and reproduce them on one or more displays within the cabin. An example of an imaging system is a rear-view camera system, which can provide a rearward view from the vehicle (e.g., a scene behind the vehicle) and display the rear view to the driver. The imaging system may also provide video images of the environment to the side of the vehicle of in front of the vehicle. The images that are displayed in the vehicle must be processed from an imager, e.g., a camera sensor, to properly display and provide the desired appearance to the user with the vehicle cabin.

Vehicle 100 can include a camera 101 that is mounted to the vehicle and looks outwardly of the vehicle. The camera 101 can be rear facing and, in an example, mounted in a bumper or other rear facing surface of the vehicle. The camera 101 being rear facing to permit the operator to view traffic conditions to rearward from left and right sides of the vehicle, as well as directly behind the vehicle. In an example, the camera is one of a plurality of cameras, which can be rear facing with a left video camera and a right video cameras mounted on the left and right sides of the motor vehicle forwardly of the driver's position. Camera 101 can be a small CMOS imager. Other imagers may be used. Camera 101 can be housed in a canister of about one centimeter to about three centimeters in diameter by about three centimeters in length. The camera 101 may include a small fixed-focus or variable-focus lens that focus light on the solid-state imaging chip. The camera lens can be normal or wide angle or can be a zoom arrangement which is movable between normal and wide positions. A wide-angle lens can provide a video image with a field of view in a range of about 130° to 200°, +/−5°, or +/−10° or 15°. Such a wide-angle lens in the camera 100 presents a significantly distorted image and presents technical challenges to displaying the video image. It is desirable to correct for some of the distorted, e.g., fish eye, effects of these types of wide-angle cameras. Image processing can be used to adjust a raw camera produced image for display in a vehicle.

The camera 101 outputs video image data 103. Image processing can be performed at the camera 101 to format the video image for display in the vehicle. The image is focused using a lens on the imager. An image signal processor produces an image suitable for display. The video data processed by the image signal processor is serialized and sent to a de-serializer and displayed on a screen. Conventionally, this serialized signal is not raw image data. In examples of the present disclosure, the image signal includes a raw image data. In an example, the image data is a raw image 103 that is sent to the vehicle's head unit 105. The head unit 105 is positioned remotely from the camera. The head unit 105 can be mounted in the vehicle cabin, e.g., under the dashboard, in the center of the dashboard, in a center console, beneath a seat or combinations thereof. The head unit 105 includes an image signal processor 111 that uses processing parameters 113 to process the raw image(s) (e.g., a video) 103 into a form suitable for transmitting to the display 107. The image signal processor 111 can insert overlays onto the image output to the display 107 and can compute the location of objects in the video image. The image signal processor 111 can also correct for the distortion effects produced by using a wide-angle lens in the imager 101. The image signal processor 111 can also receive navigational positioning information, e.g., from a global positioning system (GPS), and integrate the navigational positioning information into the video for output on the display 107. The display 107 can be a liquid crystal display in communication with circuitry in the head unit 105.

The head unit 105 can operate to process a plurality of functions in a vehicle in addition to image signal processing for display. The head unit can provide infotainment to the vehicle occupants, e.g., play music, provide navigation instructions, perform voice recognition, mobile communications, store the owner's manual and the like. These functions can be performed in parallel with the image processing. In an example, a same digital signal processor in the head unit 105 can be used for processing the raw image into an image suitable for display.

Figure 2:
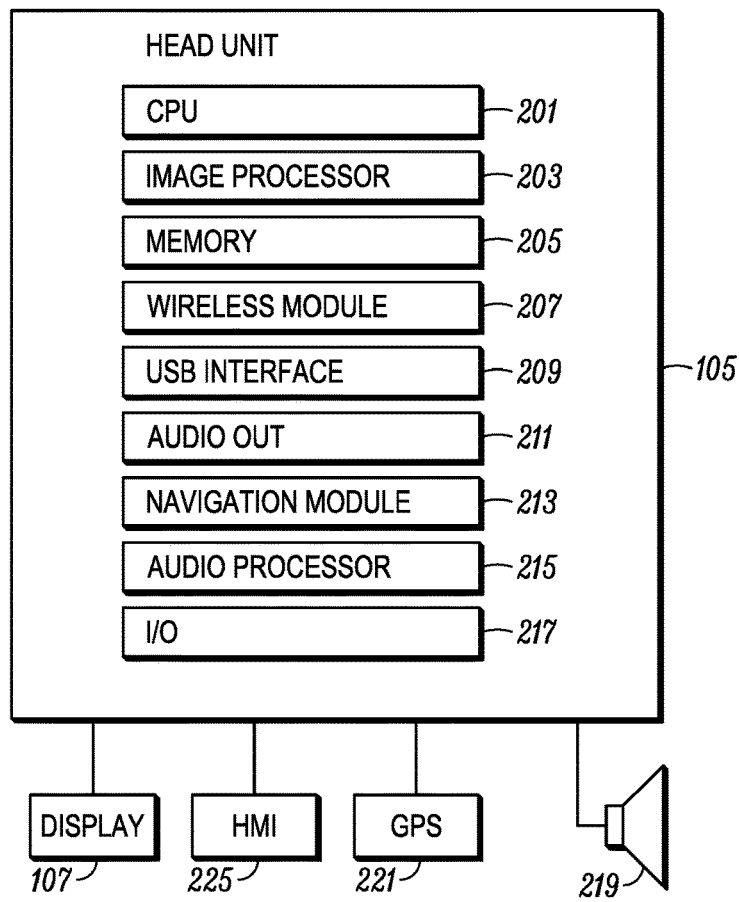
FIG. 2 illustrates schematic view of a vehicle head unit according to an embodiment of the present disclosure.

FIG. 2 illustrates a head unit 105 installed in a vehicle 100. The head unit 105 can include various modules that operate to provide various functions, which may be different than those described herein. A processor 201 is provided to execute instructions on data stored in the head unit or from sensors in the vehicle. An image processor 203 may be provided to work in parallel with the processor 201, in some examples. In other examples, the processor 201 processes the raw image data into a form for display. A memory 205 is proved to store data needed by the head unit 105. The memory 205 can store data relating to any function of the head unit and instructions for execution be at least one of the processor 201 or the image processor 203. The memory 205 can store image data and instructions for processing the image data into a form for presentation on the display 107. The image processing data in the memory can include a look-up-table that has parameters to process the raw video image. The look-up-table (LUT) can be particular to a specific vehicle type and a specific model, and possibly a specific trim package. The LUT can be downloaded and is specific to the specific configuration of the vehicle. A wireless module 207 allows the head unit to communicate via short range wireless, e.g., Bluetooth, or long range wireless, e.g., cellular or Wi-Fi. A USB interface 209 is provided to allows data upload or download. The audio out 211 can output audio data, e.g., to speaker 219. A navigation module 213 can provide navigation instructions, maps, and location information. An audio processor 215 can process audio signals, e.g., satellite radio, radio, digital files, and the like. An input/output module 217 allows input and output signals to be sent to the head unit 105. The display 107 is connected to the head unit 105 and can provide visual indicators for any of the functions of the head unit. A satellite positioning module 221, e.g., a global positioning system device, is in communication with the head unit 105. A human-machine-interface module 225 is provided in the vehicle to allow a person to interact with the head unit. The head unit 105 can also operate to process the raw camera image into a form for display at the display 107.

Figure 3:
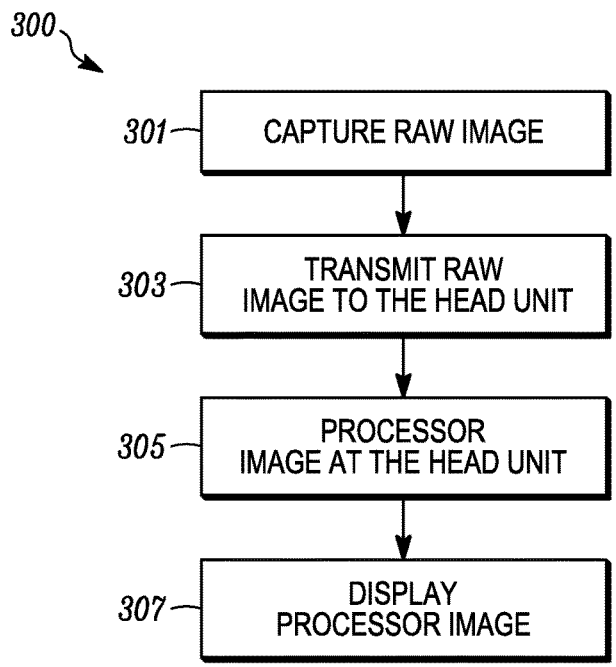
FIG. 3 illustrates a method for an imaging system according to an embodiment of the present disclosure.

FIG. 3 illustrates a method 300 for displaying an image in a vehicle. At 301, an image of the external environment is captured using an image (e.g., a CMOS chip or a CCD chip in the camera) that is pointed outwardly from the vehicle. The image can be a raw image that is not processed at the imager or is minimally processed to a form for electrical communication to the head unit. At 303, the raw image data is transmitted to the head unit. In an example, the video data is serialized to transmit the data over an electrical line to the head unit, which can de-serialize the video data. The imager can also packetize the video data to send to the head unit. At 305, the raw image data is processed by the head unit, e.g., for display on a display in the vehicle. At 307, the processed image is displayed.

The head unit 105 can operate on instructions loaded into a processor to out a video image from a camera on a display that has various features relative to the raw or source image data. The viewing image that is output to the display may be a rear view that capture a first minimum height at the lowest portion of a vertical band on target F and target G and a second minimum height above the highest portion of the horizontal band on targets A, B & C, with reference to the raw image shown in FIG. 12. The target image can also be used to set skew, rotation and other processing parameters for producing an output image for display. The viewing image output by the head unit may default to a rear view if vehicle movement state is invalid or unavailable. The head unit may down sample the image or show fewer frames per second in low light conditions to enhance image quality. The head unit will have the ability to detect an incorrect/stuck or frozen image. The head unit may allow a user to enable/disable backup overlay guidelines using customization menu or inputs, e.g., from steering wheel controls or touch screen controls. The head unit can overlay steering guidelines on the output image that represent the width of the rear end of the vehicle. The steering guidelines depend on steering wheel or tire position(s), which are input into the image processor. The head unit can dynamically adjust the steering guidelines to show the projected path of the vehicle based upon the steering angle, vehicle dimensions and vehicle velocity. The head unit may further reduce the steering overlay to not block the obstacles in the image. The head unit may also detect obstacles and unavailable features and send a warning to a driver regarding obstacles or unavailable features. The head unit may only use steering overlays if they do not block obstacles in the image.

Figure 4:
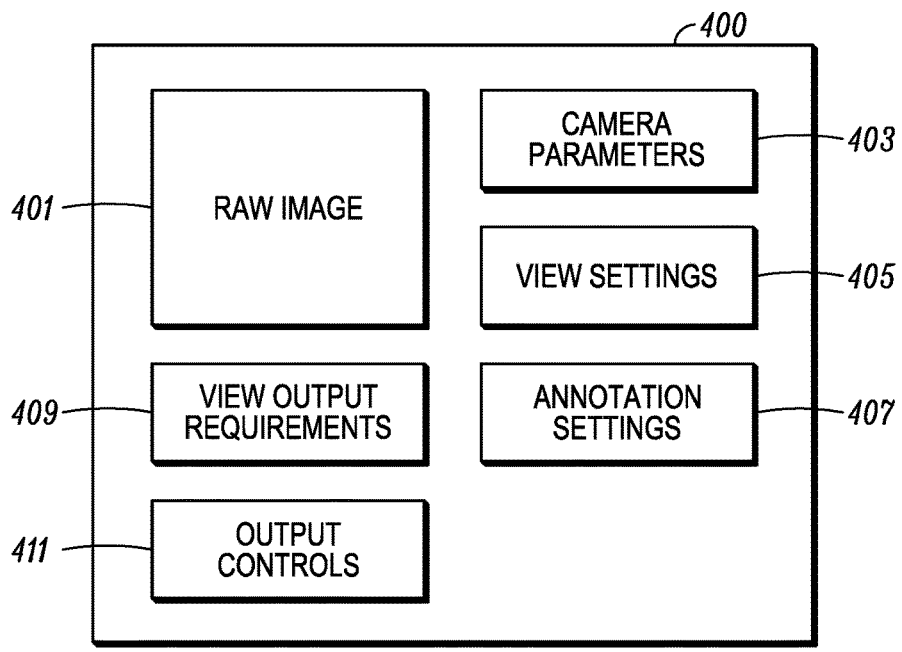
FIG. 4 illustrates a system for generating a vehicle image file according to an embodiment of the present disclosure.

FIG. 4 illustrates a schematic view of a graphical user interface 400 for generating a file or parameters to control displaying a video image. The interface 400 organizes the image that is being evaluated with the various inputs that are applied to the image to determine the parameters to process a raw image to produce a display of a processed video image. The graphical user interface 400 is shown on a display in communication with a processor that is dedicated to execute instructions to determine parameters for processing a raw video image, e.g., from a camera mounted in a vehicle, for display on a display in the vehicle. The cameras in vehicles are typically wide angle imagers, e.g., in a field of view greater than 130° and up to about 200°. This wide-angle imaging creates distortions in the image that should be corrected before showing the video image to a vehicle operator. The present graphical user interface 400 provides a single screen to change most of the image processing parameters and then output a sample image. If the sample image is sufficient, the parameters are saved and output to use in programming the image processing algorithm or module in the head unit. The processing parameters can be output in a look up table or other data record that is dedicated to the type of vehicle and the type of camera. The interface 400 includes a camera parameters input 403 to allow the input of various camera settings that are particular to the type of camera. The interface 400 includes a view settings control 405 that allows a user to change view settings to allow the settings to be changed in real-time and the effect of the changes can be calculated on the raw image and output for viewing and approval by the image processor. The interface 400 includes an annotation settings field 407 that allow the user to select which annotations will be included in the output image. Having annotations shown on the output image for review, allows a user to visually identify certain characteristics in the output image easily and to identify changes. The interface 400 includes a view output requirements field 409, which are requirements by the vehicle manufacturer. These are requirements for the output image. Output controls 411 allow a user to select the type of output from the present algorithm.

Figure 5:
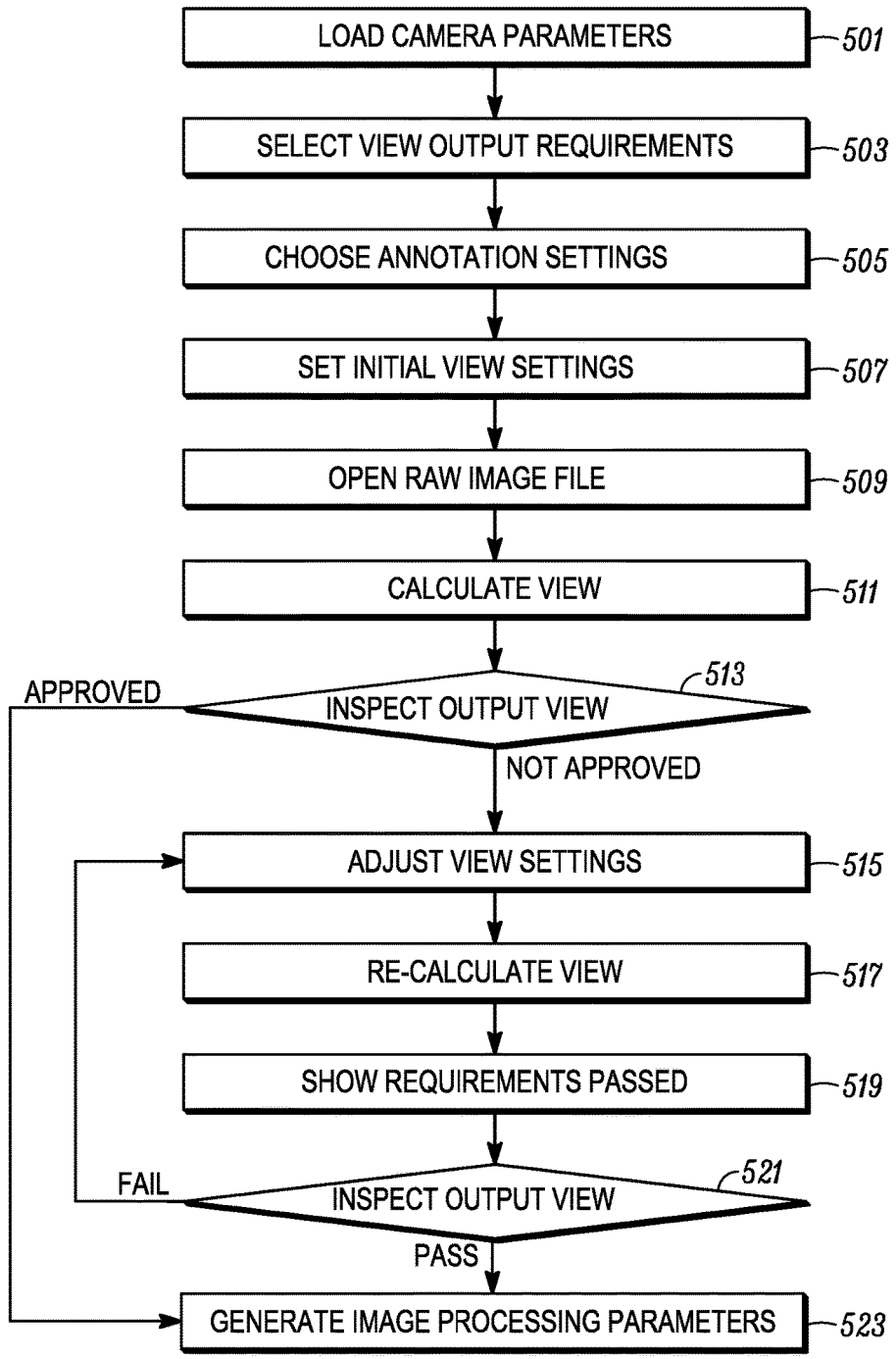
FIG. 5 illustrates a method for generating a vehicle image processing file according to an embodiment of the present disclosure.

FIG. 5 illustrates a method 500 for generating an output image for display in a vehicle. At 501, camera parameters are loaded into the algorithm or image processing parameter module. The camera parameters can include certain characteristics that are performance characteristics of the camera. At 503, the output requirements are set. The output requirements are the requirements by the manufacturer relating to the image that will be output by the head unit to a vehicle operator. Some of the output requirements may be set by governmental entities or standards bodies. At 505, the annotations settings are set. The annotation settings indicate what information, e.g., overlays and positional information, are shown on the resulting image that is processed according to the present method 500. At 507, the view settings are selected. The view settings may set other control settings for processing the raw image into an output image. Examples of view settings include, but are not limited to, distortion strength, zoom level, vertical offset, horizontal offset, and tilt level. With these settings and output requirements being set, a raw image is input at 509. At 511, the review view is calculated using the raw image and the parameter settings and requirements. At 513, the review image is displayed and inspected. If the review image is approved for production, then the image processing parameters that created the review image are generated and saved (step 523). These image processing parameters can be encrypted to prevent alteration. The image processing parameters can be used to produce an algorithm, head unit parameters or a look up table of parameters that can be used to process a video image in a head unit to output the video image on a vehicle display.

In operation, the changing of the settings or parameters, e.g., in step 515, which may result a near real-time change in the results. At 517, the view is re-calculated. Re-calculating may include providing information about compliance with view requirements without graphically processing a new output image from the raw image file. By showing the view requirements when parameters or settings are changed, the designer user can see compliance of the potential output image without graphically reprocessing the raw image to the output image. In an example, a change in the settings or parameters does not go back to the raw camera image file or to the image file received from the camera. The current image can be modified by the changes in real time with the image as previously processed.

At 519, the new image is show to see if the requirements are now passed. At 521, a determination of whether the display image has passed. If the newly shown display image does not pass, then the process returns to step 515 to further adjust at least one of the settings and parameters. If the display image passes, then at 523 the image processing parameters are set. These image processing parameters can be encrypted to prevent alteration. The image processing parameters can be used to produce an algorithm, head unit parameters or a look up table of parameters that can be used to process a video image in a head unit to output the video image on a vehicle display.

Figure 6A:
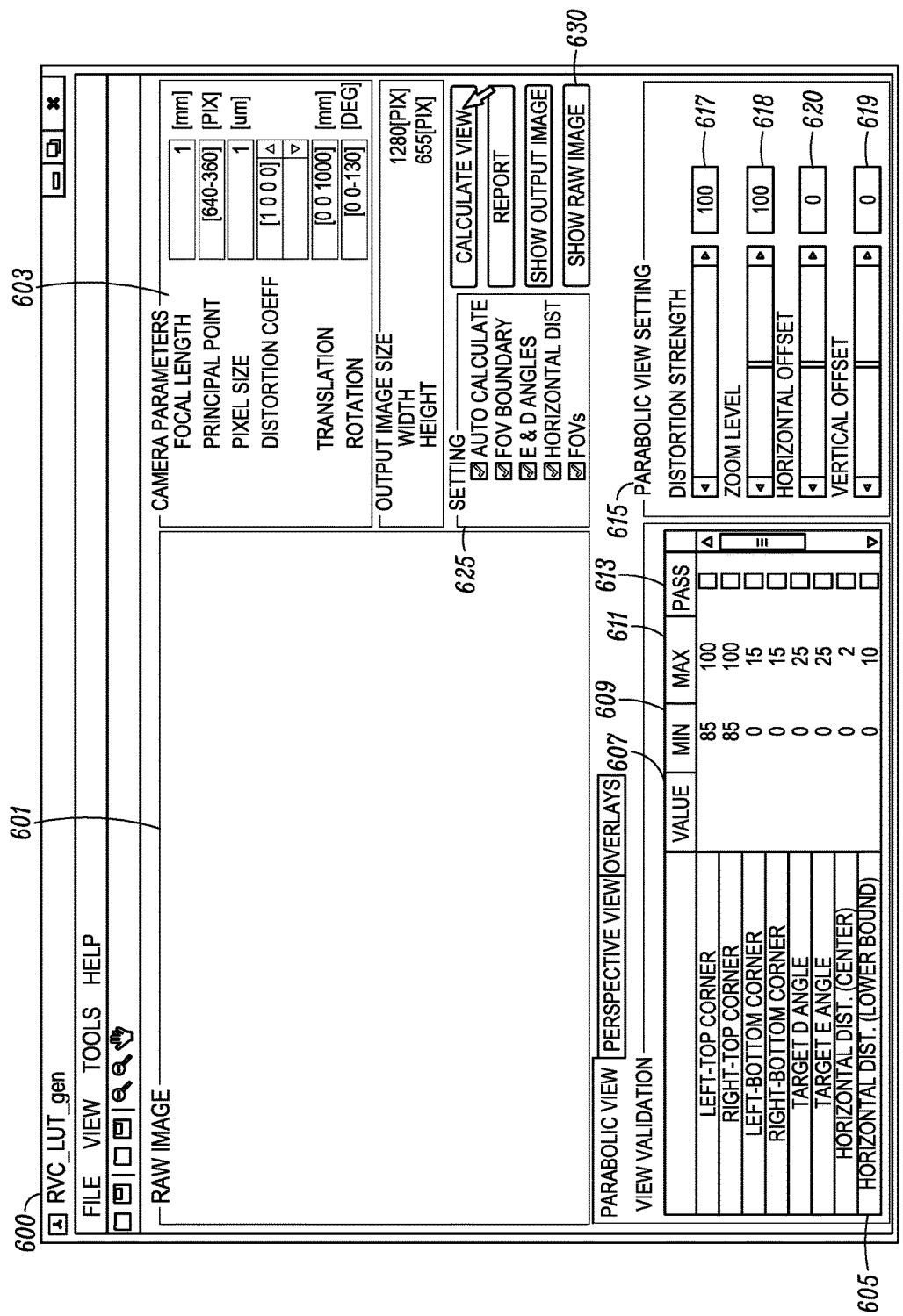
FIGS. 6A and 6B illustrate a graphical user interface for a vehicle image generator according to an embodiment of the present disclosure.
Figure 6B:
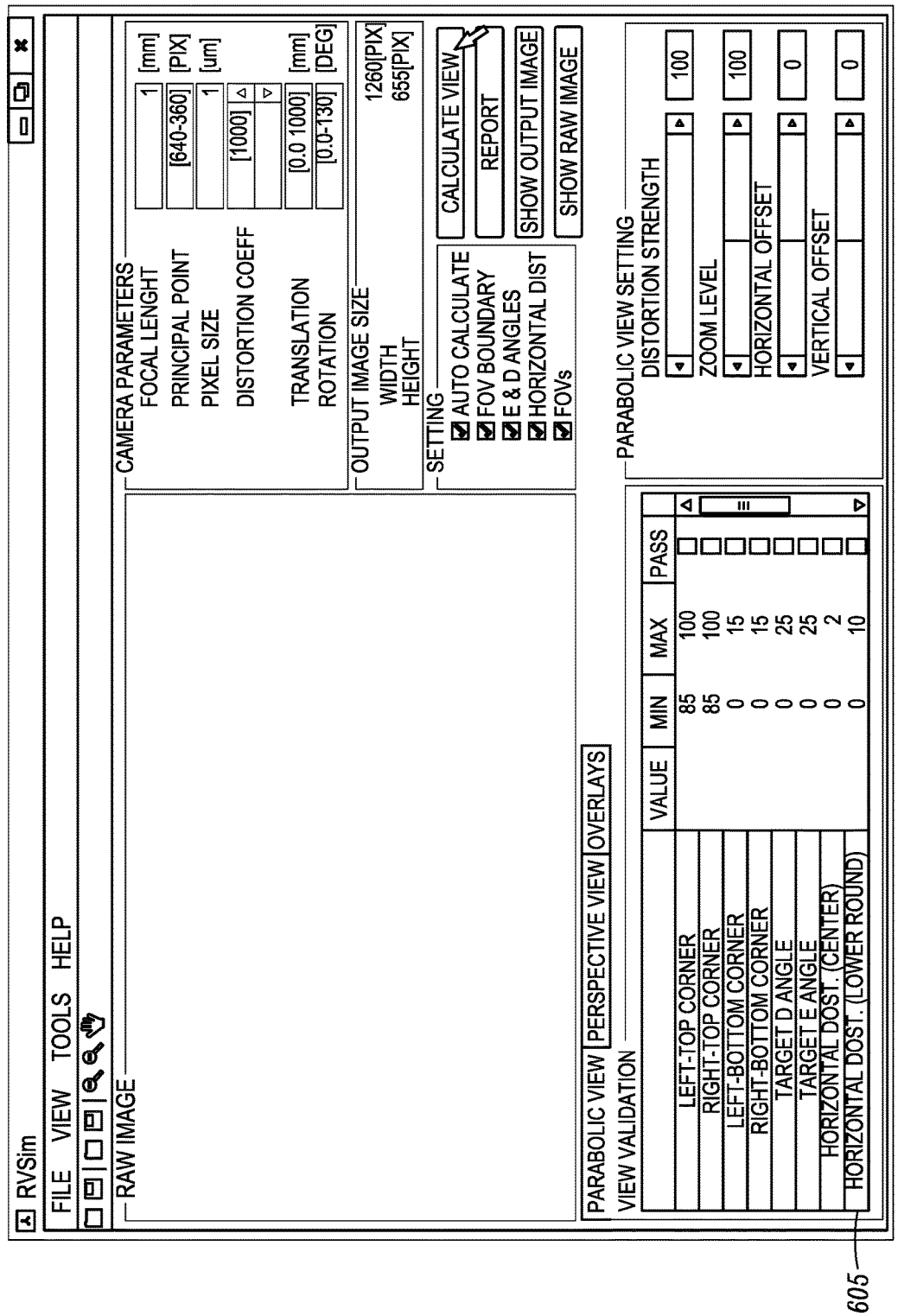

FIGS. 6A and 6B illustrate a view of a graphical user interface 600 for three use cases, parabolic view, perspective view and overlay. The parabolic view tab is used for steps in generating a file or parameters for displaying video images from the exterior facing rear camera in a vehicle. The views from the imagers or cameras are parabolic due to the wide-angle lenses on the imagers or cameras. The perspective view tab is used to display the real camera position and allow adjustment of the virtual camera position for the desired perspective view transformation. The real camera position is set by the "Translation" and "Rotation" parameters in the camera parameters section 603 of the graphical user interface 600. The overlays tab is to be used for checking overlay guide lines against geometry of the car. The overlay guide lines can show the predicted travel direction of the vehicle.

The interface 600 includes various inputs that allow a user to change parameters for processing the raw image. A raw image window 601 provides a space to show the raw image that is being processed using settings and parameters that can be set or changed in the interface 600. The parameters on the interface include common parameters, which are shared across all three tabs i.e., the parabolic view tab, the perspective tab and the overlay tab) and the parameters specific for a given tab. A tab is a selected region in the graphical user interface that allows the user to select a different portion of the graphical user interface 600 and different functionality for the interface 600. The common parameters on the interface are camera parameters 603 and annotation settings 625, as well as various output control buttons 630 are provided to allow the user to select the output from the video image processing methods and systems described herein. Drop down menus such as File, View, Tools and Help may also be provided. The View and Tools drop down menus allow access to some of the input features shown on interface 600. The parabolic view tab's specific parameters are view validation parameters 605, view settings 615. The perspective view's tab's specific parameters are Perspective View Visualization 602 and Virtual Camera Position 616. The overlay tab's specific parameters are Car Parameters 621, Overlay Parameters 627 and Steering Angle 634.

Common camera parameter 603, which can be shown as input fields in the interface, are shown. The camera parameters define features of the camera that is being used in the vehicle. The camera parameters can be provided by the camera manufacturer. The camera parameters 603 may include the focal length (e.g., in mm), which defines the focal length of the lens in the camera that is to be used in the vehicle. The camera parameters 603 may include the principal point input, which allows the input of the center pixel location of the camera as a coordinate. The camera parameters 603 may include the pixel size, e.g., in μm. The camera parameters 603 may include the lens distortion coefficient, which may include a value representing a divergence from rectilinear projection caused by a change in magnification with increasing distance from the optical axis of an optical system. The camera parameters 603 may include the translation value, which may be a mounting location, e.g., coordinates. The camera parameters 603 may include the rotation value, which can be the pitch of the mounting position of the camera (e.g., degrees rotated). These parameters can be used as processing parameters to produce an image to show on a display.

Figure 12:
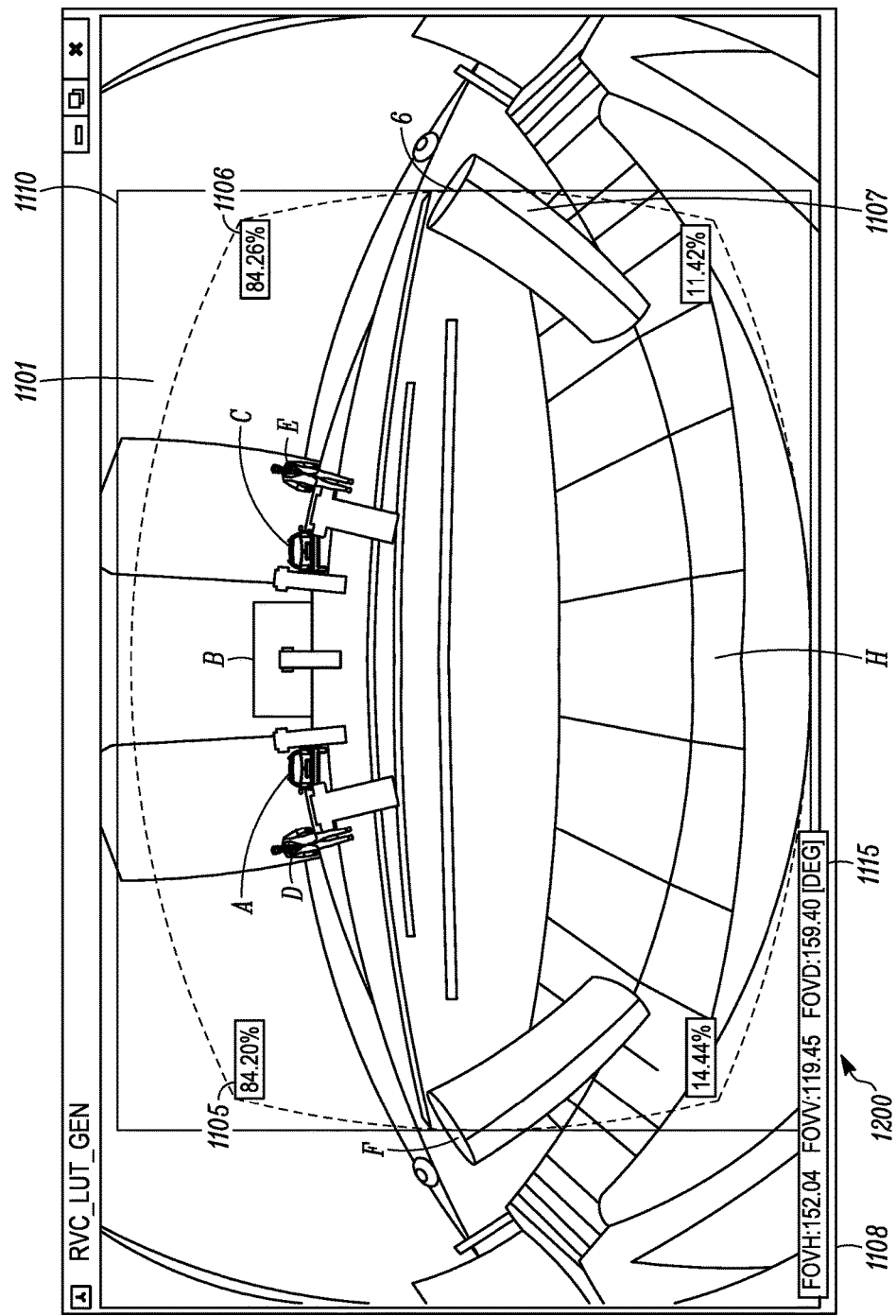
FIG. 12 illustrates a graphical user interface for a vehicle image generator according to an embodiment of the present disclosure.

Additional common parameters are Annotation Settings, which allow a user to select the annotations on the processed image. Examples of annotations include, but are not limited to, auto-calculate, which when selected causes the system to automatically calculate a new image result for review when the sliders in the view settings are released. The field of view boundary, when selected, overlays an indicator on the resulting processed image that shows the field of view that will be output to a vehicle display. In FIG. 12 described below, this indicator is shown as a green ellipse but with defined corners. The image within the indictor will be shown as the output image. The E and D angles setting enable/disables the annotation of target E and D on the output image. These angles are the angle from true vertical of the targets D and E. The horizontal distance setting enables and disables horizontal distance annotations in the output image. The field of view (FOV) setting enables and disables the field of view annotations in the output image.

The graphical user common interface 600 further provides Output Control Buttons 630 that allow a user to produce an output using the settings and parameters. The output controls buttons 630, when selected can calculate a new output image, generate the look up table, perform error correction in the look up table (e.g., checksum), show the output image and show the raw image.

The interface 600 for the Parabolic View tab includes view validation parameters 605, which can be shown as input fields in the interface. The validation parameters 605 can be manufacturer requirements for the final image to be displayed by the head unit. The validation parameter fields can include the names of the parameters, a computed value 607 (which is blank in GUI 600 as an image has not been selected for processing), a minimum value in column 609, a maximum value in column 611 and an indicator of pass or fail on column 613. The validation parameters may include, but are not limited to the following: the left top corner position, the right top corner position, the left bottom corner position, and the right bottom corner position. The corner positions can all be defined as a percentage of the height of the raw image. The validation parameters may also include a target D angle and a target E angle, which are the angles from vertical for the targets D and E, respectively. The target labels are shown in subsequent views. The validation parameters may also include a horizontal distance distortion, e.g., at the center and at the bottom. These can be expressed as percentages and measured as the amount of curvature in a line that would be horizontal in the real world before the distortion effects of the wide-angle camera lens. The validation parameters may also include a reference point, which may be the number of pixels from bottom to a manually selected reference point divided by total image height. This can be used to define the percentage or part of the image that includes part of the vehicle, e.g., the bumper. The validation parameters may also include image field of view parameters, e.g., horizontal, vertical and diagonal field of views, which can be expressed as degrees or percentages.

The interface 600 includes view settings 615, which can be shown as control input fields in the interface. The control input fields can be filed in which a value can be typed in and/or can include slider bars to select the value, which can then be shown in the input field. These view settings are used to process a raw video image and produce an image to be evaluated for producing an image to display from the head unit or to a vehicle operator. The view setting 615 may include a distortion strength parameter 617, a zoom level 618, a vertical offset 619, a horizontal offset 620, and a tilt level parameter 621. Each of these may be adjusted by moving the slider or by typing a new value into the adjacent input box. The distortion strength parameter 617 may be the percent of distortion correction applied from 0% (no correction) to 100% (full linear correction) to the raw image. The zoom level 618 is the amount of zoom as a percent of the original image. The vertical offset 619 is the vertical offset from the center of the original raw image. The horizontal offset 620 is the horizontal offset from the center of the original raw image. The tilt level parameter 621 corresponds to a virtual camera position when doing a perspective shift on the original image. The user can adjust these parameters and produce new images efficiently to see the changes caused by parameter changes.

In operation, the changing of any of the view settings 615 results a near real-time change in the results at the view validation parameters 605. The new output image need not be graphically processed and shown as a graphic view for the changed view settings to change the results in the view validation parameters 605. By showing the view requirements when parameters or settings are changed, the designer user can see compliance of the potential output image without graphically processing the output image. The value for each of the view validation parameters in column 607 is compared to the minimum and maximum thresholds in columns 609 and 611. When the value is within the range, or equal to the range boundaries, then the view validation parameter (column 607), then the validation parameter is indicated as pass or valid in column 613.

Figure 7A:
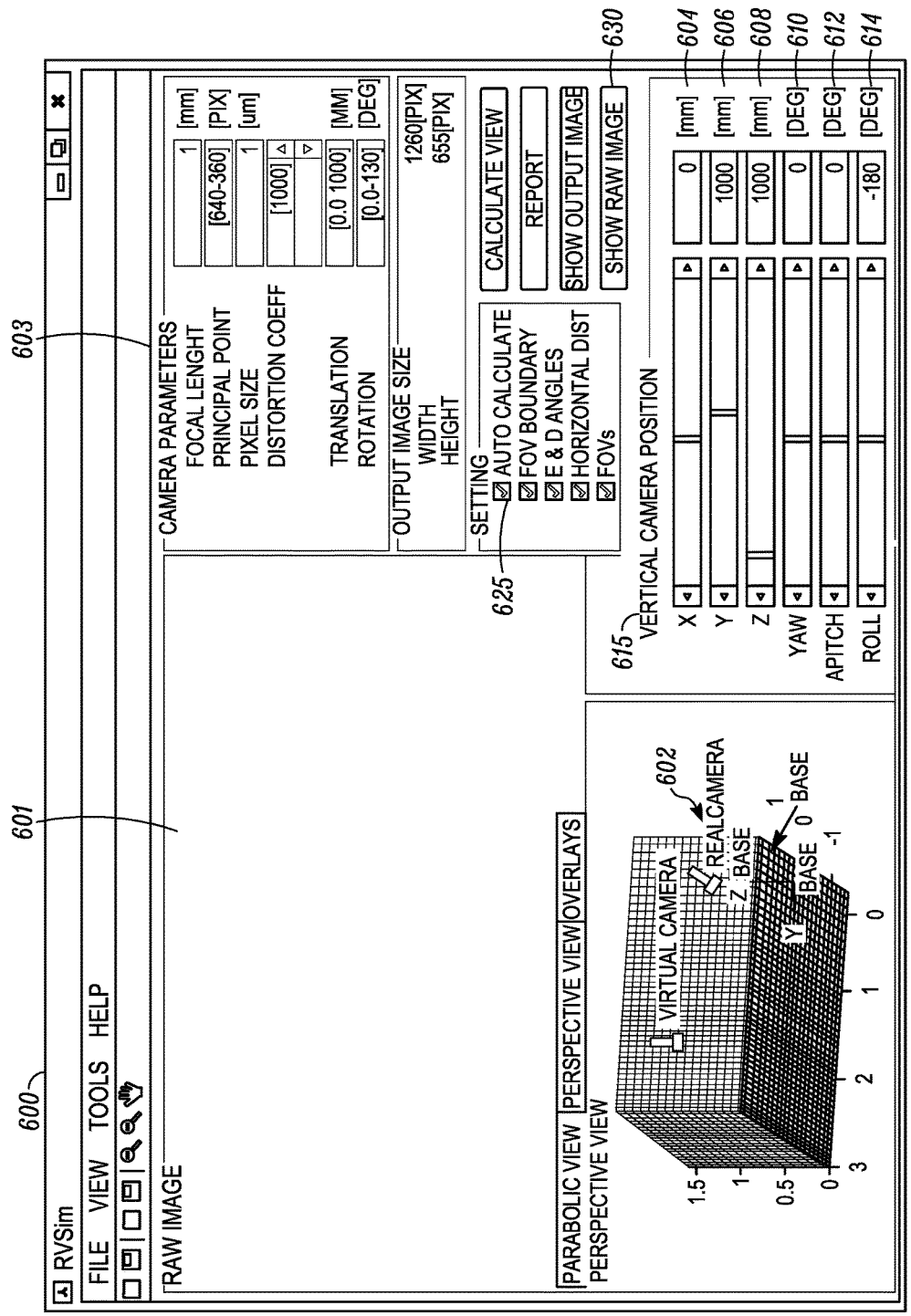
FIGS. 7A and 7B illustrate a graphical user interface for a vehicle image generator according to an embodiment of the present disclosure.

FIG. 7A shows the interface 600 for perspective view tab includes perspective view 3D visualization diagram 602, which shows 3D relative position between real and virtual camera. It also includes sliders and input fields for virtual camera position/orientation 615. The control input fields can be filed in which a value can be typed in and/or can be modified by moving slider bars to select the value, which will then be represented in the input field. X parameter 604 is virtual camera position from the origin in the X direction as defined in the perspective view window, measured in millimeters. Y parameter 606 is virtual camera position from the origin in the Y direction as defined in the perspective view window. Measured in millimeters. Z parameter 608 is virtual camera position from the origin in the Z direction as defined in the perspective view window, measured in millimeters. Changing this value accomplishes a zoom in or out. Yaw parameter 610 is rotation around the Z-axis in degrees. Pitch parameter 612 is rotation around the Y-axis in degrees (correct to roll). Roll parameter 614 is rotation around the X-axis in degrees (correct to pitch). When, these parameters are changed after the raw image is processed, the image processor does not start processing at the raw image. Instead the image processor, which receives its input from the graphical user interface only changes the display image to a new display image.

Figure 7B:
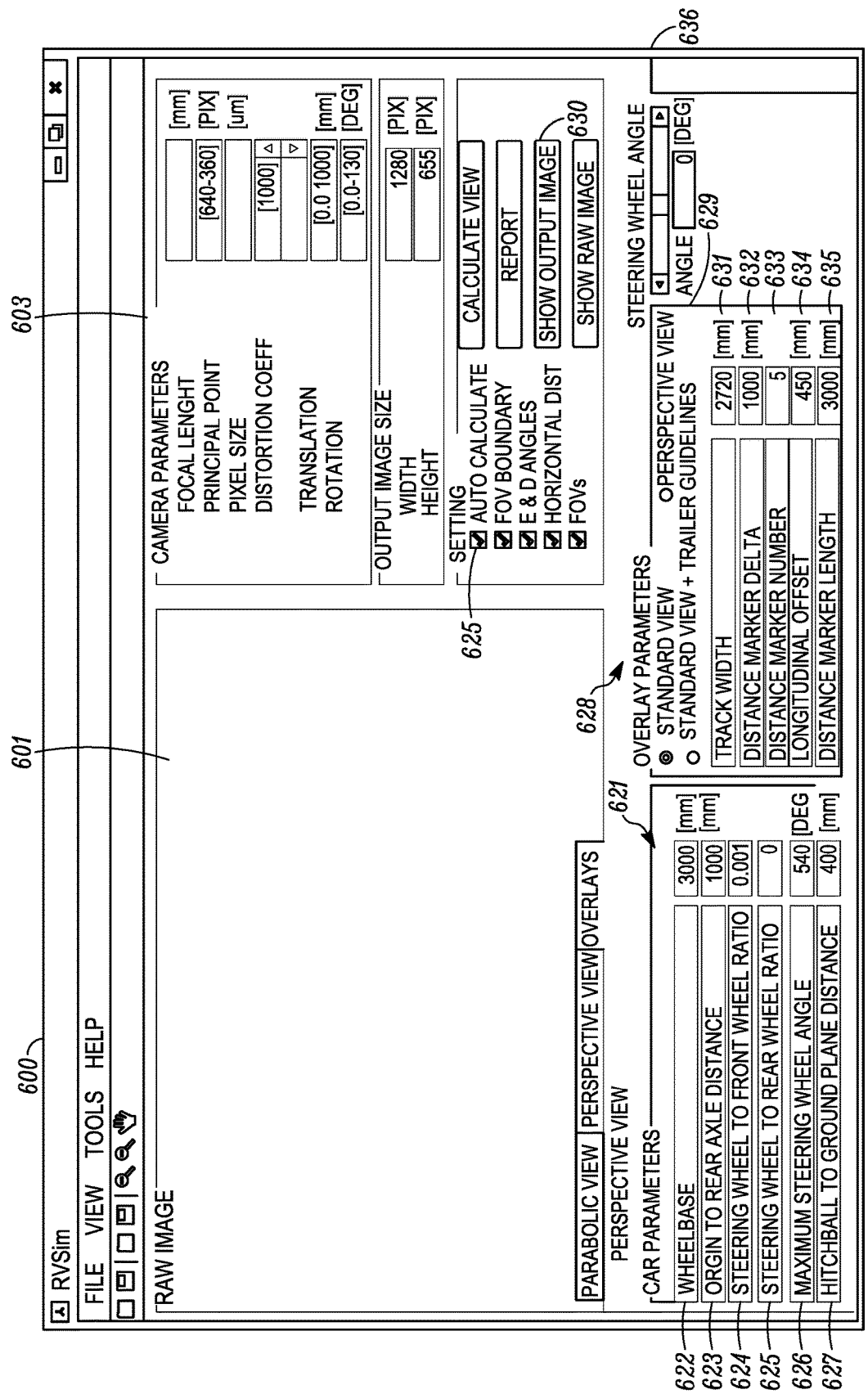

FIG. 7B shows the interface 600 with the overlays tab selected, which replaces the 3D perspective representation or the view validation section with a car parameters interface 621 and overlay parameters interface 628. The interface 600 for overlays tab includes car parameters 621, overlay parameters 627 and steering wheel angle parameter 634.

Car parameters 621 consists of list of control input fields where value can be input into the graphical user interface. It may include following parameters. A wheelbase parameter 622 is distance between the centers of the front and rear wheels, e.g., in mm. An origin to rear axle distance parameter 623 is distance from rear axle to back edge of rear bumper, e.g., in mm. A steering wheel to front wheel ratio parameter 624 is an inverse steering ratio for front wheel, which can include a conversion from degrees to radians. A steering wheel to rear wheel ratio parameter 625 is an inverse steering ratio for the rear wheel, which can include conversion from degrees to radians. A maximum steering wheel angle parameter 626 is the hand wheel angle where steering ratio becomes invalid (relation between steering wheel and front wheel becomes nonlinear). A hitchball to ground plane distance parameter 627 is a distance between the center of the hitchball and ground plane, e.g., in mm.

These parameters may depend on the specific type of vehicle that the image processor is producing an image.

Overlay parameters interface 628 is composed of radio buttons 629 and control input fields where value can be input 631-635. Radio buttons 629 enables the user to choose one of the three possible options: standard view which is parabolic view with standard overlay parking guidelines; perspective view perspective—being view with trailer overlay guidelines; standard View+Trailer which includes guidelines in parabolic view with trailer overlay guidelines. A track width field 631 is lateral distance between guidelines, e.g., in mm. A distance marker delta field 632 is longitudinal distance between distance marks. A distance marker number field 633 is number of markers to show. A longitudinal offset field 634 is distance from back edge of rear bumper to center of hitchball. This field 634 may be available only in Perspective View or Standard View+Trailer Guidelines modes. A distance marker length field 635 is length of distance marker line. This field may only be available only in Perspective View or Standard View+Trailer Guidelines modes. Thus, some of these fields are not available in all views on the interface. When a field is not available, then it will not accept input from a user. The fields each represent a single processing parameter for the image processor to use to output an image file for a display.

Figure 8:
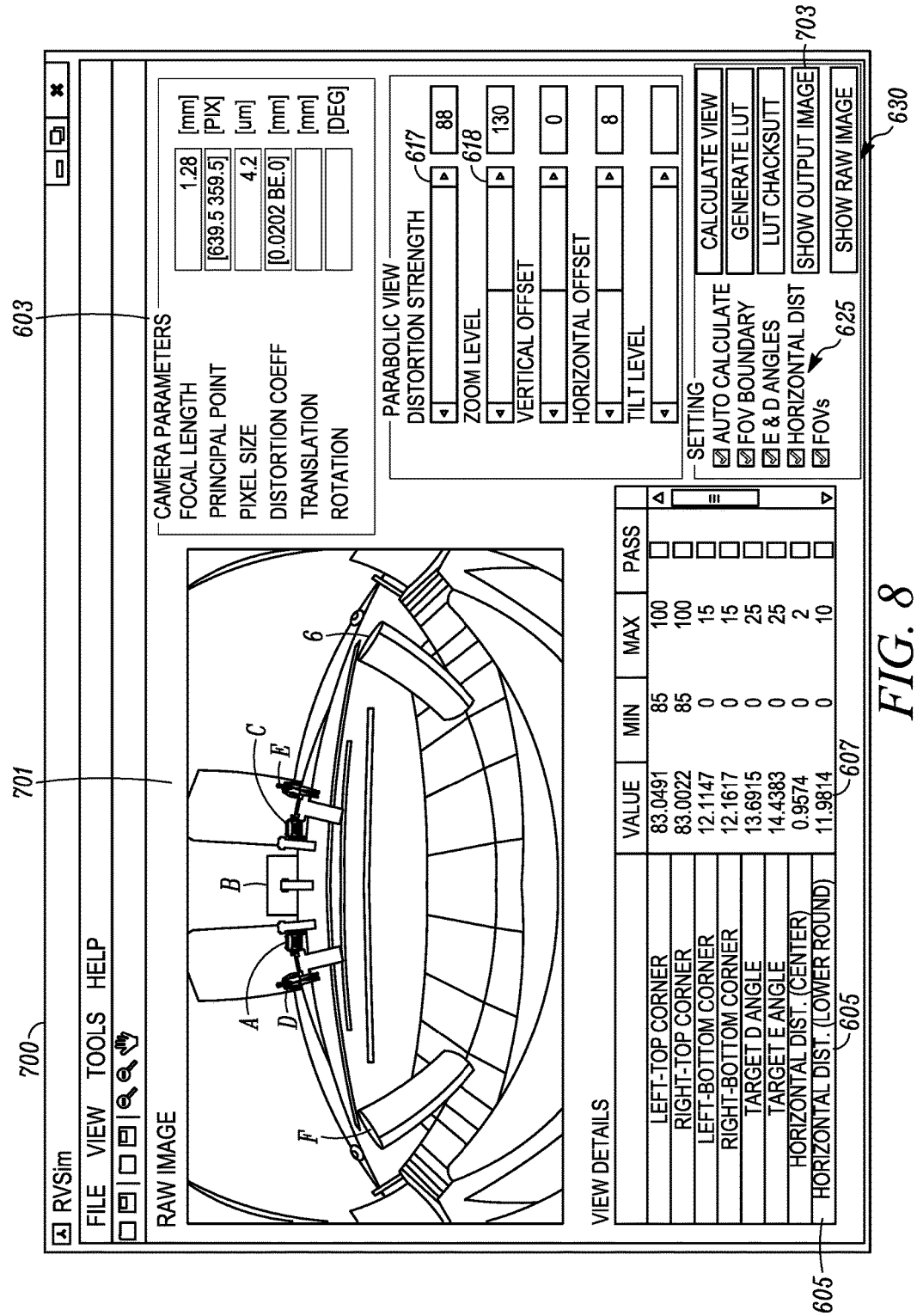
FIG. 8 illustrates a graphical user interface for a vehicle image generator according to an embodiment of the present disclosure.

FIG. 8 illustrates a view of a graphical user interface 700 for a step in generating a file or parameters for displaying video images from the exterior facing camera in a vehicle. The graphical user interface 700 is similar to the graphical user interface 600 but shows a further processing step with the raw image loaded into the image field 601. The raw image can be a model image that is used to calibrate the parameters in the look up table for use in a vehicle. The targets A-G are shown in this image. The camera parameters 603 are input. All of the annotation settings 625 are selected. The distortion strength parameter 617 and a zoom level 618 are changed relative to the GUI 600. The values in the output image are calculated and shown in value column 607 for each validation parameter 605. An indicator of whether the value for the validation parameter meets the parameter limitation is shown in column 613. The user need not process a full image to determine if the current settings and parameters meet the requirements in validation settings 605. If the resulting output image is calculations are acceptable to the user, then the user can select the show output image button 705 to have the system and method produce an output image from the raw image. Processing images takes significant time relative to the calculations done to determine if the settings and parameters pass or fail the validation parameters 605. Thus, the present interface 600, 700 allows a user to quickly change parameters and settings to produce an output image that is likely to be acceptable.

As shown in the graphical user interface 700 some parameters of the resulting image as shown in section 701, which can be a raw image or a processed image, do not pass the required values. For example, the left-top corner, the right-top corner and the horizontal distance (center) and the horizontal distance (lower round) are not within an acceptable range. The processing parameters must be changed to bring the image into compliance with the vehicle specifications.

Figure 9:
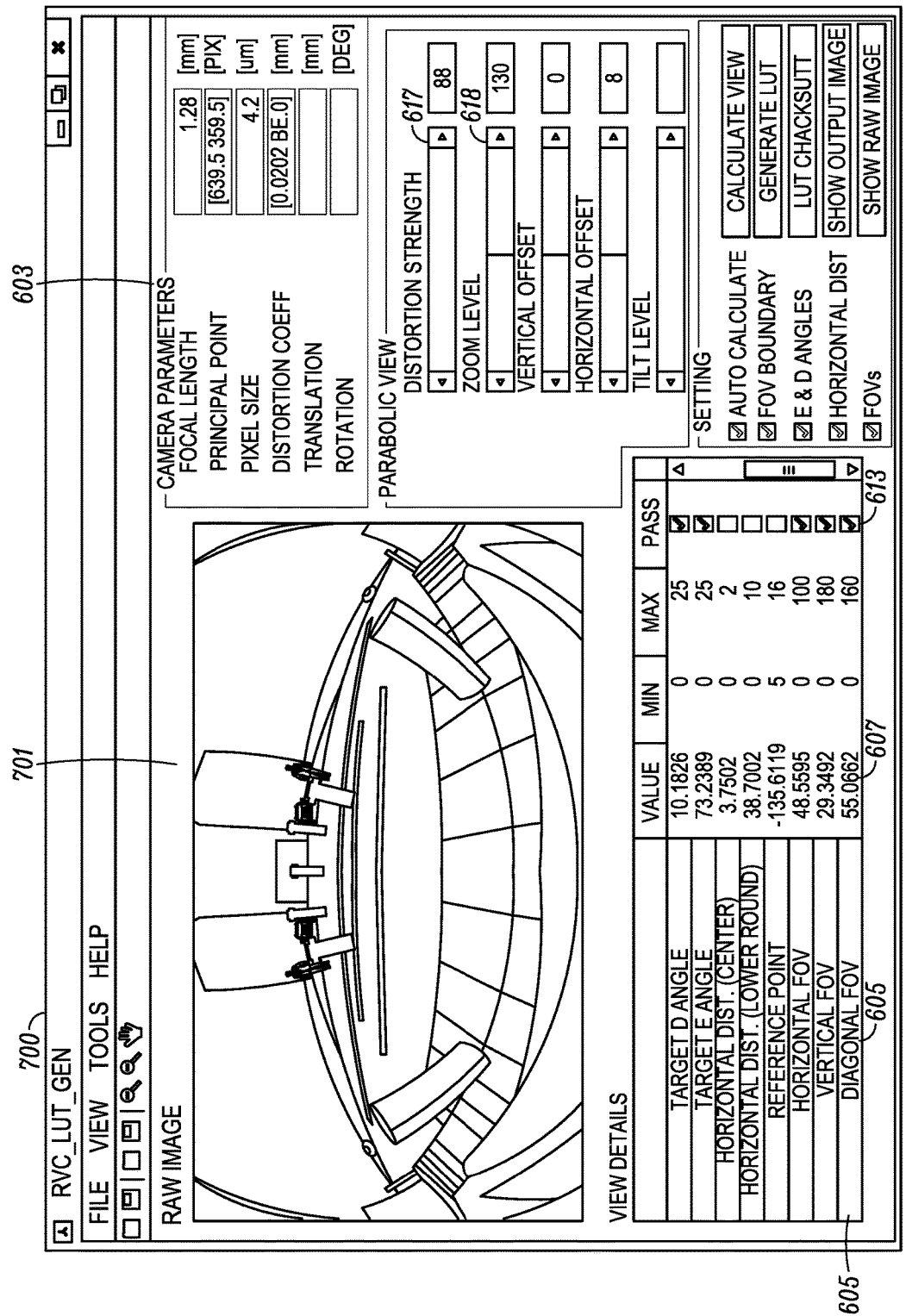
FIG. 9 illustrates a graphical user interface for a vehicle image generator according to an embodiment of the present disclosure.

FIG. 9 illustrates a graphical user interface 800 for a step in generating a file or parameters for displaying video images from the exterior facing camera in a vehicle. The graphical user interface 800 is similar to the interfaces 600, 700 and shows the raw image loaded into the image field 601. Additional validation parameters are shown in 605, along with their values and whether they pass or fail the parameter limits. Interface 800 further shows additional changes to the distortion strength 617 and the zoom level relative to interfaces 600, 700. These changes will change the calculated values for validation parameters 605 as shown in column 607

Figure 10:
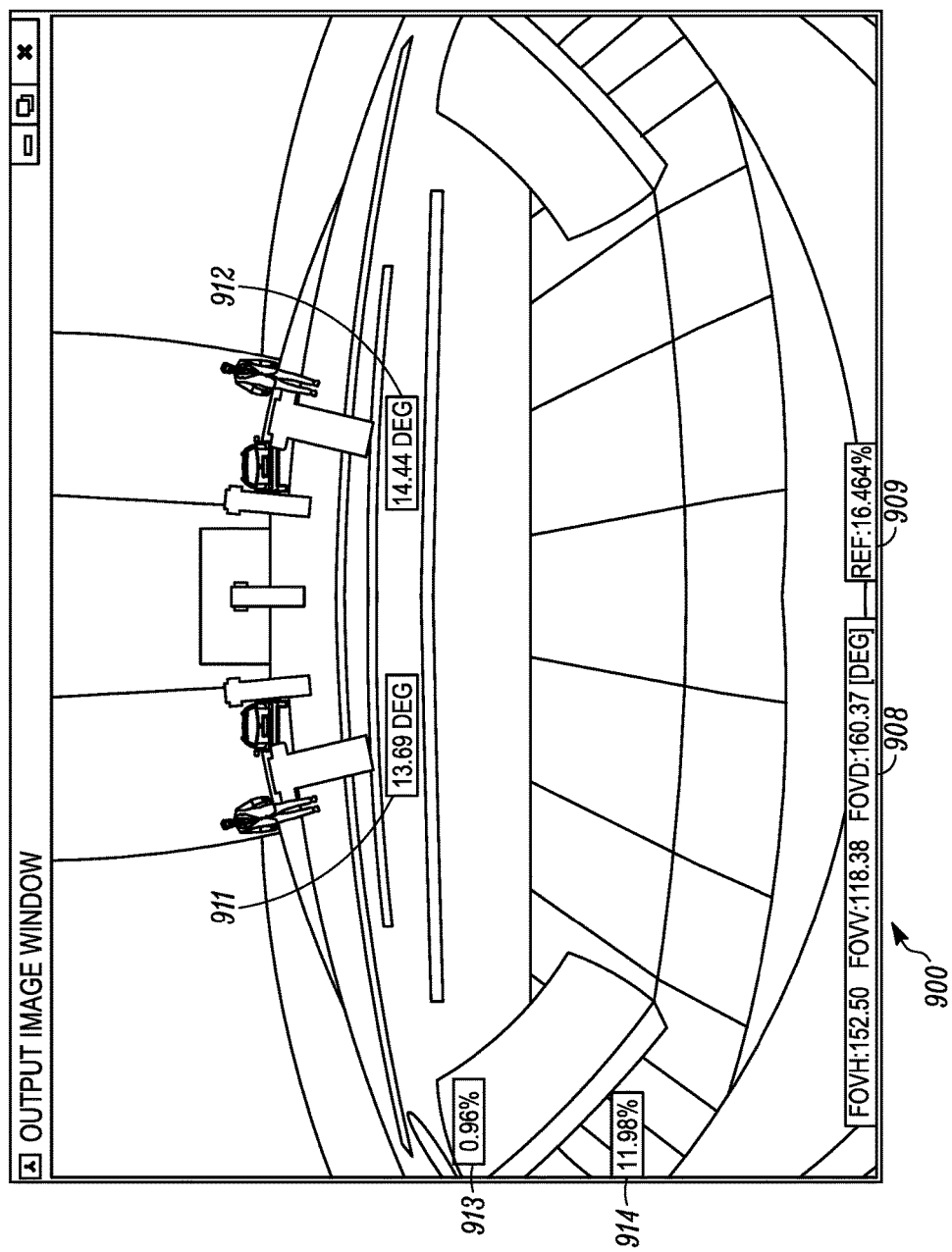
FIG. 10 illustrates a graphical user interface for a vehicle image generator according to an embodiment of the present disclosure.

FIG. 10 illustrates an output image 900 from the graphical user interface 800. This output image 900 is processed according to the parameters and settings in interface 800 and represents and processed image in the output image window, which can be part of any of the interfaces described herein. The output image 900 can be displayed on any display connected to the image processor and need not be the same display as that used in the vehicle. The parameters and values in the interfaces 600, 700 include the specifications for the actual display for the vehicle. The annotations 908-913 are shown and illustrate the field of view annotations 908, the horizontal distance annotation 913, 914 (as percentages, e.g., 0.96% and 11.98%) and the angles of targets E and D 911, 912 relative to vertical (13.69 degrees and 14.44 degrees, repsectively). The values annotated in the interface 900 are the actual computed values in the image.

Figure 11:
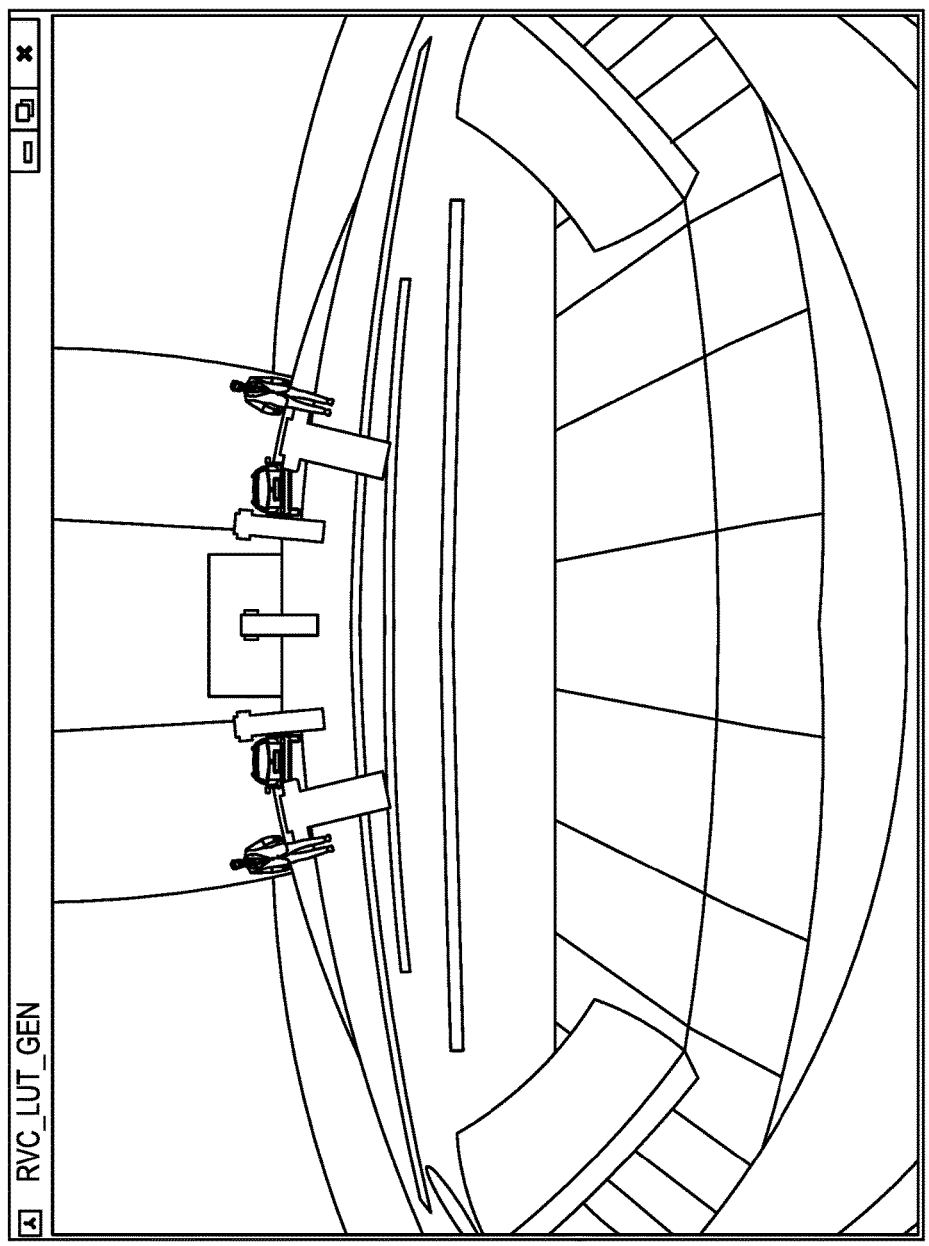
FIG. 11 illustrates a graphical user interface for a vehicle image generator according to an embodiment of the present disclosure.

FIG. 11 illustrates a graphical user interface 1000 of an output image for display in a vehicle or to determine parameters to for processing video data to generate a display. This output image in FIG. 11 is the same as image 900 without the annotations. The annotation settings 625 are all deselected to produce the output image 1000.

FIG. 12 illustrates a view of a graphical user interface 1100 of an output image for display in a vehicle or to determine parameters to for processing video data to generate a display. In view 1100, the test image is shown with various annotations overlaid on the test image. The annotations can be selected at the graphical user interface 600 in the settings 625. An image frame 1101 is overlaid on the test image. This can be selected by selecting the FOV boundary on the settings 625. The image frame 1101 indicates the portion of the raw image, here, a test image, that will be the processed image to be shown on display when the head unit outputs the image. The corners 1105, 1106, 1107, and 1108 can be set by selecting the corner and moving the indicator (here, a red cross) to change the position of the corner. The top left corner 1105 is positioned at 84.10%. The top right corner 1106 is positioned at 84.05%. The bottom right corner 1107 is positioned at 14.49%. The bottom left corner 1108 is positioned at 14.44%. The new positions of the corners are fed back into the algorithm for determining the parameters for processing a video feed. The field of view boundary sets the area of the image that will be shown a display in the vehicle. This area is of principle review for compliance with output image requirements.

The field of view data relating to the portion of the raw image in the image frame 1101 are shown at 1115. This can be selected by selecting the FOV setting on the settings 625. Examples of the field of view data include, but are not limited to, field of view horizontal, field of view vertical, and field of view diagonal. These variables can be shown as angles, here, 152.04 degrees, 119.45 degrees and 159.40 degrees.

A frame 1110 is overlaid on the image and shows the end display resolution. This allows the intermediate output from the parameter developing method to visualize the distortion correction, e.g., as a percent distortion correction.

The image 1100 further shows various obstacles that are referred to in the present disclosure, these obstacles represent targets A, B, C, D, E, F, and G that are used in the image processing. Fewer or more targets may be used in a test image.

Figure 13:
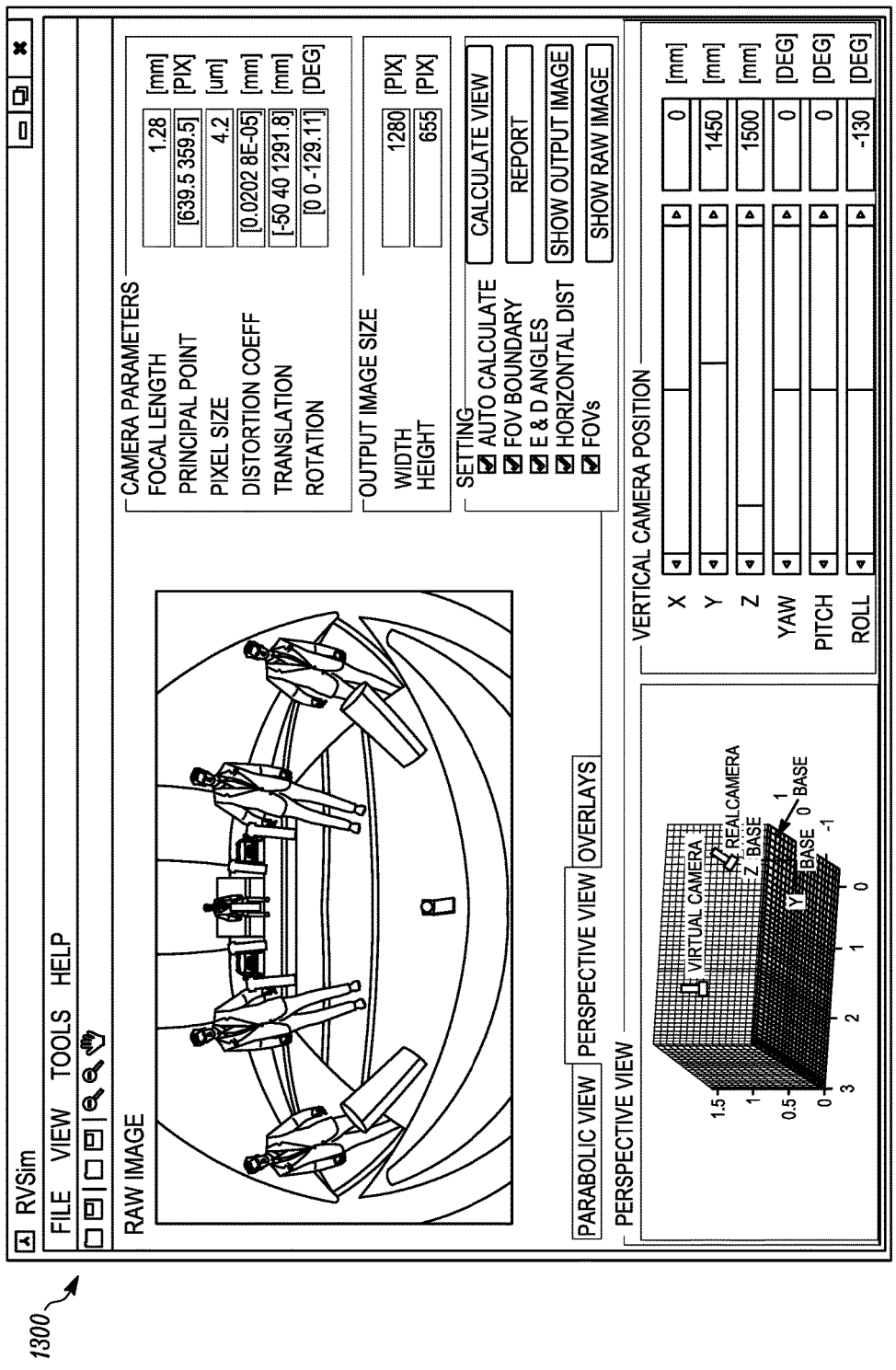
FIG. 13 illustrates a graphical user interface for a vehicle image generator according to an embodiment of the present disclosure.
Figure 14:
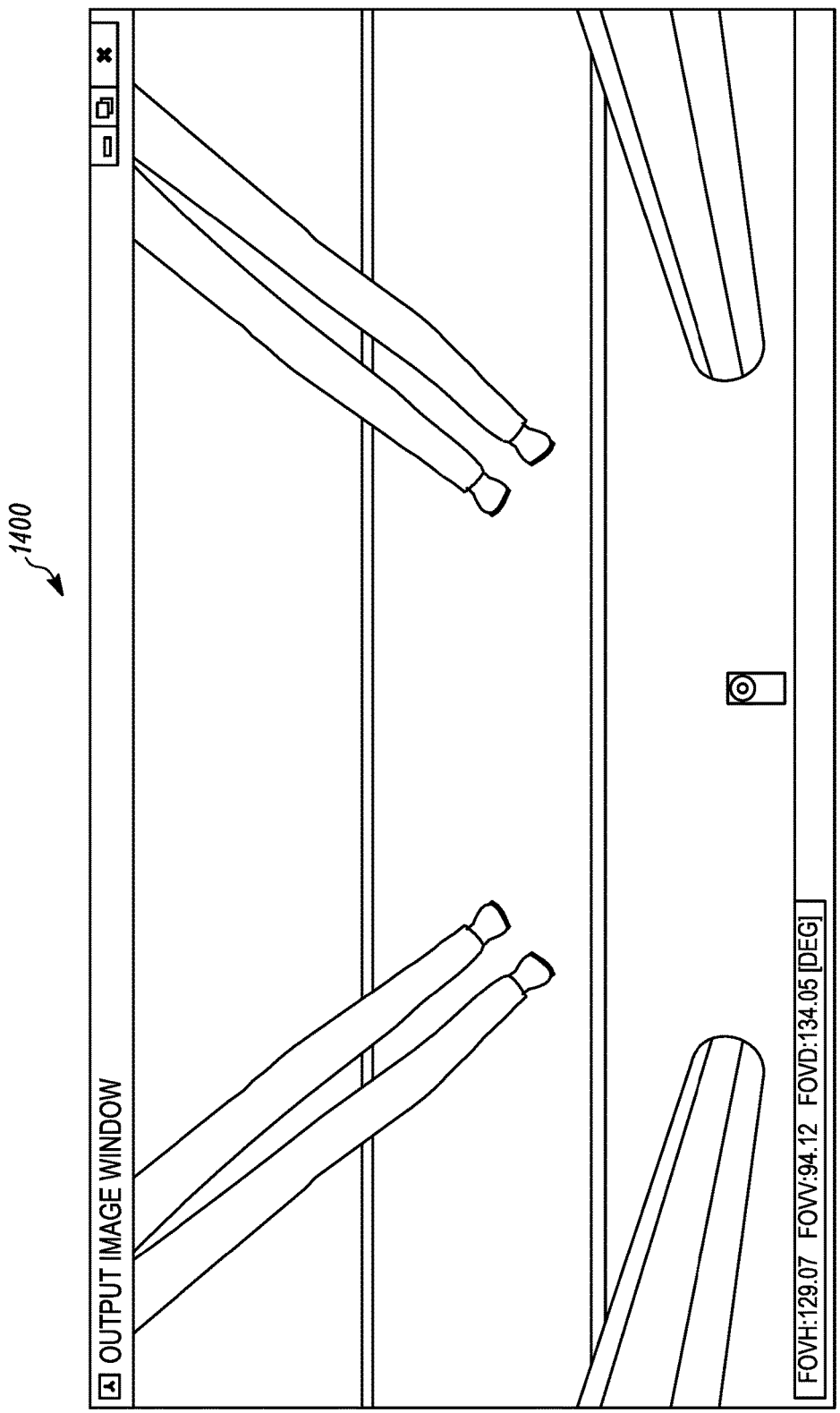
FIG. 14 illustrates a graphical user interface for a vehicle image generator according to an embodiment of the present disclosure.

FIG. 13 illustrates a perspective view visualization of the graphical user interface produced by the image processor. The selection area 1300 represents total pixels area from original raw image that will be taken to perspective view transformation. The resulting output image 1400 is shown on FIG. 14.

Figure 15A:
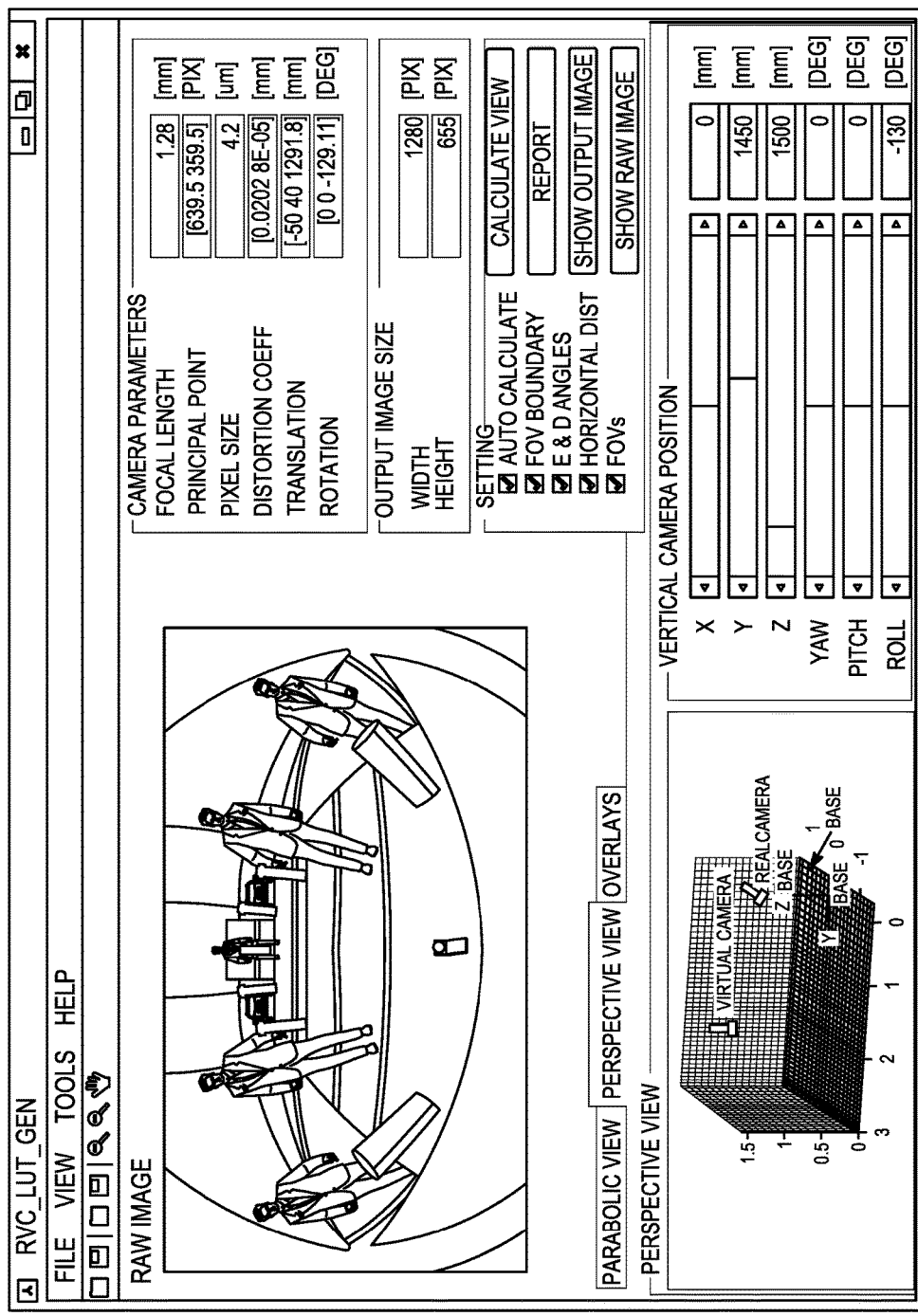
FIGS. 15A and 15B illustrate graphical user interfaces for a vehicle image generator according to an embodiment of the present disclosure.
Figure 15B:
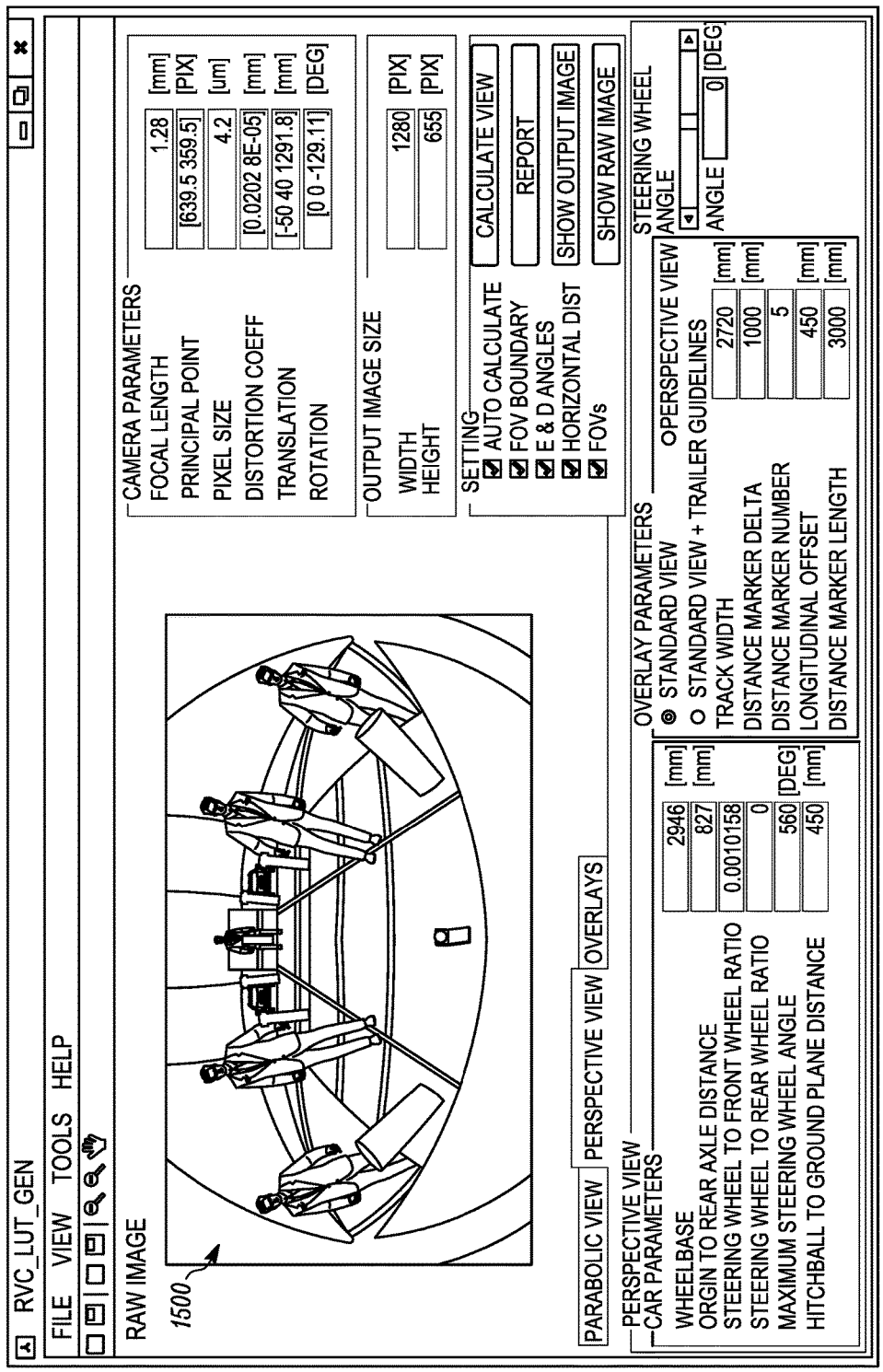

FIGS. 15A and 15B illustrate an overlays visualization for the graphical user interface. The view of FIG. 15A shows the graphical user interface for inputting processing parameters. The overlay preview 1500 in FIG. 15B shows the selected view from FIG. 15A. The overlay preview 1500 will allow user to check the layout of overlay guide lines against test points/lines in raw images or previously processed images.

Figure 16:
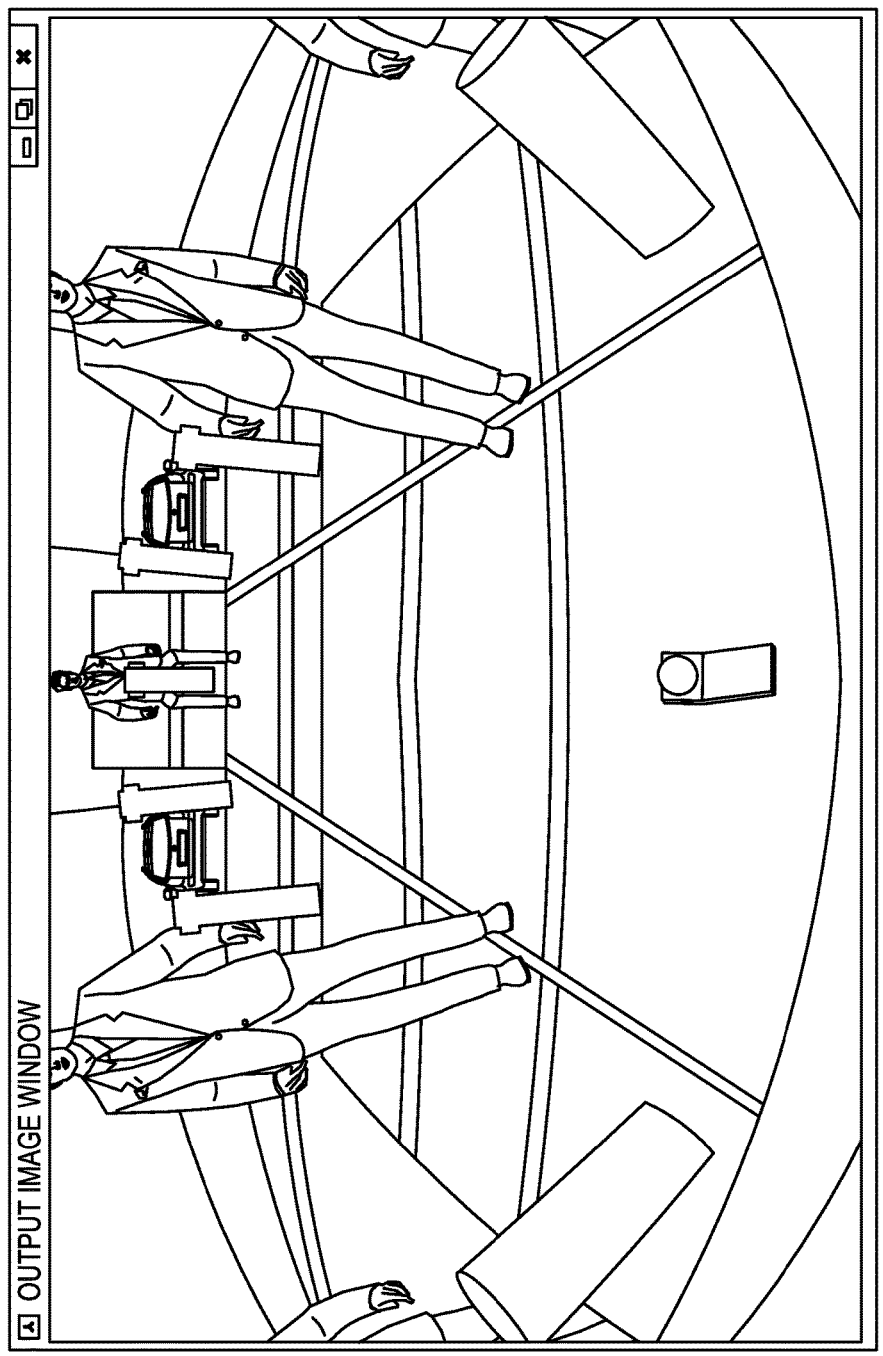
FIG. 16 illustrates a graphical user interface for a vehicle image generator according to an embodiment of the present disclosure.
Figure 17:
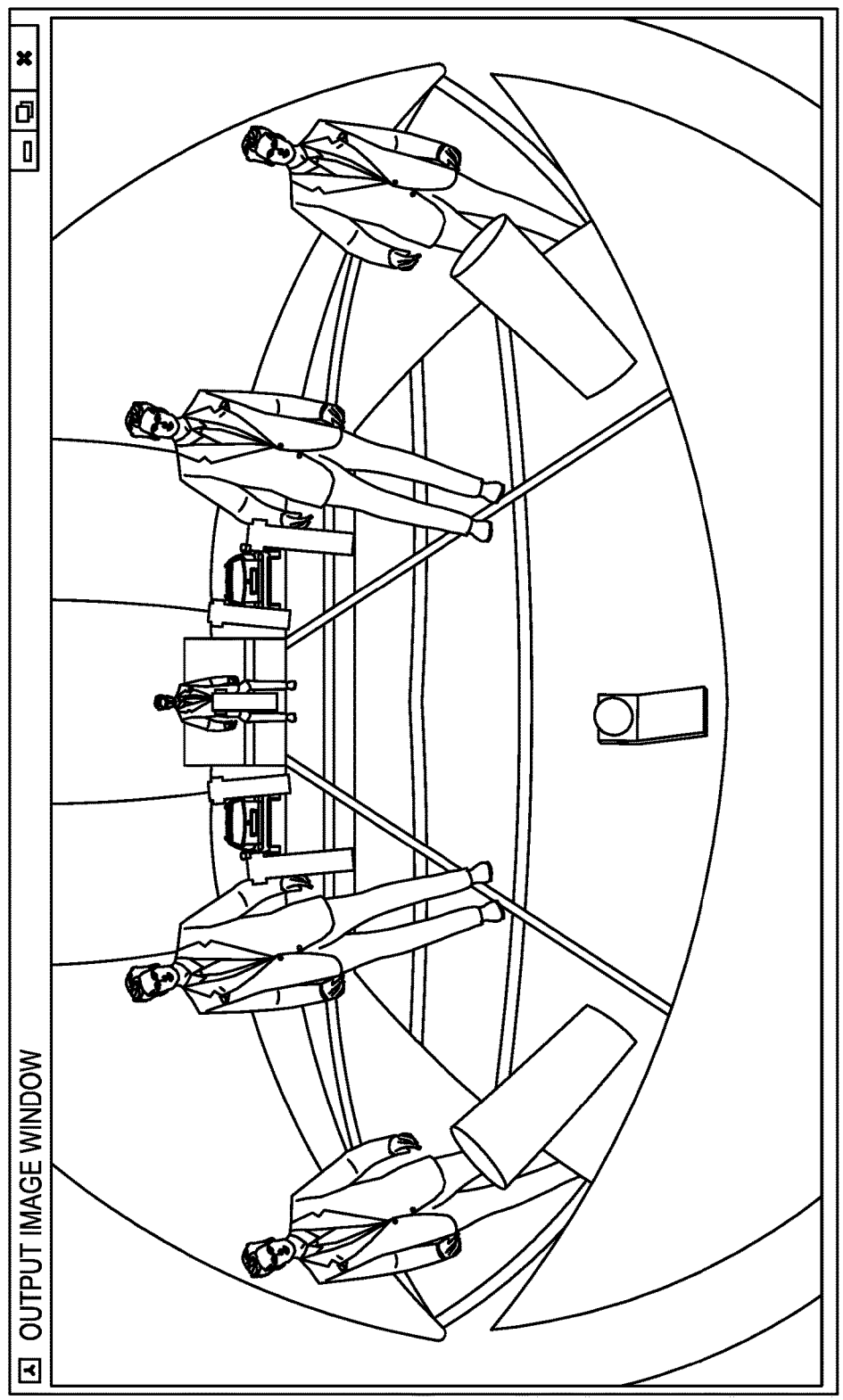
FIG. 17 illustrates a graphical user interface for a vehicle image generator according to an embodiment of the present disclosure.

FIG. 16 and FIG. 17 shows overlay testing points/lines on the output image from the image processor and on the raw, input image, respectively.

Figure 18:
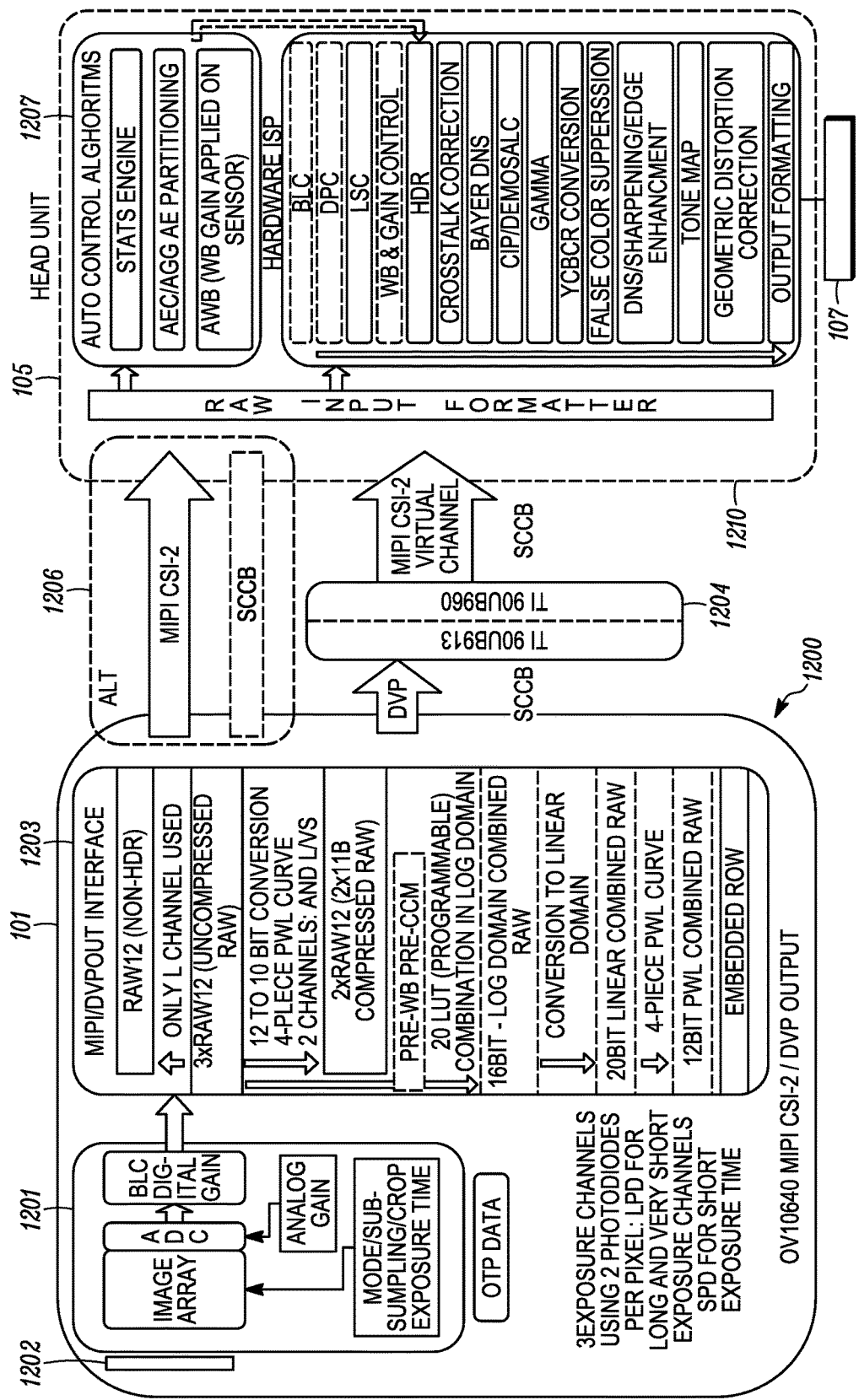
FIG. 18 illustrates a schematic view of the camera and head unit generator according to an embodiment of the present disclosure.

FIG. 18 shows a more detailed view of a system 1200 with a camera 101 for a vehicle that produces video image data and sends it to a head unit 105 for processing to be displayed in the vehicle. The camera 1201 includes an image sensing core 1201 that receives light through a lens 1202. The lens 1202 may be a wide angle lens or other lens that produces distortion that must be corrected before display at the vehicle display 107. An input/output module 1203 receives the image data and prepares it for transmission over the busses 1204 or 1026 to the head unit 105. The head unit 105 includes an automatic control module 1207, which can produce gain control for processing the image data. The head unit 105 includes the image processor 1210, which can use the parameters or look up table described herein to process the video image data and output a processed image to the display 107.

The described methods and systems allow an engineer or designer to change and select parameters and settings for generation of an output image. Individual parameters and settings can be changed and its effect on the resulting output image can be calculated and displayed in a graphical user interface without processing the entire image and inspecting the image. The output image can be produced to inspect the image and validate the computed result.

The embodiments of the present disclosure generally provide for a plurality of circuits or other electrical devices to perform the methods and build some of the operational portions of the structures and systems. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

A vehicle may have a user interface system that may communicate with one or more nomadic devices. The user interface system may include, but is not limited to, a vehicle computing system, a display, and at least one connection apparatus to communicate with one or more nomadic devices. A user may interface with the one or more nomadic devices using the vehicle interface system. The one or more nomadic devices may contain several applications that may be compatible with the interface system for operation of a feature and/or function. The applications may be executed on the nomadic device, system, and/or a combination of both; and the output data may be presented to a user at the interface system.

The one or more nomadic devices communicating with the interface system may experience different management, output, and/or display of content based on the connected nomadic device operating host (e.g., Android, Windows, iOS, etc.). A user of the system may want a user interface paradigm that offers no discernible difference to the user between nomadic devices that are communicating to the system using different operating hosts. The nomadic device may download the parameters or look up table to the head unit.

The image processor as described herein is used with a head unit of a vehicle. The image processor may also be part of a design system that is outside of a vehicle and used to determine the processing parameters for a specific vehicle type, a specific imager, a specific display, or combinations thereof. Thus, the processing parameters in the image processor may be used outside the vehicle to determine the acceptable processing parameters that are to be used with any specific vehicle set up.

The present systems and methods provide an efficient means for determining the parameters for processing image data for display in a vehicle. The parameters are dependent on the type of lens, type of camera, position of camera on the vehicle, type of vehicle, trim of vehicle, type of display, manufacturer requirements, etc. There is a need, as discovered by the present inventors, for systems and methods to address the all of these variables while reducing processing time. Processing new images each time a variable of parameter requirement changes is time consuming. Examples of the present systems and methods load the image requirements into a module along with the camera properties. Certain controllable parameters are provided at a graphical user interface and the result of changing these parameters is shown graphically without processing the image as a whole. When it is determined that the parameters meet enough of the display requirements, then the graphical user interface can instruct the system to process the image to produce an example of the output image. The output image may include various data points and annotations to assist in its review. When it is determined that the output image is acceptable, then the system or method, stores the parameters. The stored parameters are then converted into a form that can be used for that specific vehicle type and loaded into a vehicle head unit, which may process the image data from the camera to output video images on a vehicle display.

The images sensed by a camera mounted in a vehicle are displayed in the vehicle. The cameras used in vehicles have a wide-angle lens, which distorts the image that is sensed by the image sensor. This distorted image data is sent to the vehicle head unit for processing into a form suitable for display on a display, e.g., a flat panel display. The processing relies on parameters that are dependent on the type of lens, type of camera, position of camera on the vehicle, type of vehicle, trim of vehicle, type of display, etc. These parameters are stored in the head unit memory and used by processors in the head unit to correct the image data for display.

The vehicle 100 can include an on-board GPS-based navigation system to sense the position if the vehicle using signals from satellites. The navigation system can include processor, memory, GPS receiver, and communication unit 28. The position data can be used to provide navigation information on a map on the vehicle. The position of the vehicle as determined by the navigation system can be used to further refine the image from the cameras shown in the vehicle. The memory can be used to store software and data for processor to carry out various operations of navigation system. The stored software may include a navigator web browser for browsing information provided, e.g., by servers connected to the Internet. In particular, the navigator browser works compatibly with the standard hypertext transfer protocol (HTTP), hypertext markup language (HTML), virtual reality markup language (VRML), graphics interchange format (GIF), JAVA applets, etc.

The vehicle may include a display, e.g., a liquid crystal display (LCD). Through a display driver, the processor controls the display of text, graphics and camera generated image on the display as processed according to the parameters as described herein. A user interface may comprise conventional audio circuitry including a microphone and speaker for the user to communicate with navigation system via audio media. The user interface may also comprise an indicator device, e.g., a mouse, touchpad, roller ball, or a combination thereof, which may enable a user to move a cursor on display and to point and click at a displayed option or an icon to select same. In addition, the user interface may incorporate well-known touch-screen circuitry (not shown). With this circuitry, the user can interact with the processor by using a finger or a stylus to touch the surface of display, which is tactile-sensitive. The processor receives from the touch screen circuitry a signal identifying the location on the display where it has been touched. If such a location matches the predetermined location of one of displayed options or icons, the processor determines that the option or icon has been selected. Otherwise, a cursor is placed at the touched location on display, prompting for an input from the user.

The present disclosure uses the term "tabs" to describe a selectable icon component in a graphical user interface that provides a man-to-machine interface. A tab can be selected using an input device, e.g., a keyboard, a mouse, a touch screen, a joy stick, a pointing device or the like. The tab being selected will cause the system to provide additional selectable icons or input boxes or regions or the like.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A vehicle image processing system, comprising:
   an image source to provide image data;
   an image processor configured to:
   receive the image data from the image source;
   apply at least one of a plurality of processing parameters to the image data;
   generating a view based on the at least one parameter;
   receive an indication that the view does not comply with at least one output requirement, wherein the at least one output requirement includes image quality requirements set by at least one of a vehicle manufacturer and a government standard; and
   adjust, in response to the indication, at least one of the parameters to further modify the image data.

2. The vehicle image processing system according to claim 1, wherein the image processor is further configured to adjust at least one of the parameters to further modify the image data until receiving an indication that the view complies with the at least one output requirement and setting the parameters to output a display image in response to an indication that the view complies with the at least one output requirement.

3. The vehicle image processing system according to claim 1, further comprising a head unit with a memory, the processor further configured to instruct the memory to store the adjusted parameters for processing the image data in response to receiving an indication that the view complies with the at least one output requirement.

4. The vehicle image processing system according to claim 3, further comprising a global positioning system configured to determine a location of the vehicle; and wherein the image processor is configured to apply a location parameter based on the location of the vehicle.

5. The vehicle image processing system according to claim 1, wherein the image source is a wide angle camera with a field of view greater than 130° and up to about 200°, and wherein the processing parameters correct for at least some of distortion of the image data resulting from a wide angle camera.

6. The vehicle image processing system according to claim 1, wherein the image processor is remote from the image source.

7. A vehicle image processing method, comprising:
   receiving image data from a vehicle camera;
   apply at least one of a plurality of processing parameters to the image data;
   displaying a first output image;
   changing at least one of the parameters in response to receiving an indication that the first output image does not comply with at least one output requirement, wherein the at least one output requirement includes image quality requirements set by at least one of a vehicle manufacturer and a government standard;
   applying the changed parameters to the image; and
   outputting a second output image based on changed parameters.

8. The vehicle image processing method of claim 7, wherein the parameters include at least one of a distortion strength parameter, a zoom level parameter, a vertical offset parameter, a horizontal offset parameter, and a tilt level parameter.

9. The vehicle image processing method of claim 7, wherein changing at least one of the parameter of the processing parameters results in a near real-time change in outputting a reprocessed output image.

10. The vehicle image processing method of claim 7, further comprising displaying the parameters via graphical user interface.

11. The vehicle image processing method of claim 10, wherein the display includes at least one of a perspective view 3D visualization diagram, overlay parameters, car parameters, and steering wheel angle parameter, and a combination thereof.

12. The vehicle image processing method of claim 7, further comprising receiving position data from a navigational positioning system, and displaying the position data concurrently with the second output image.

* * * * *